US008300656B2

(12) United States Patent
Buda et al.

(10) Patent No.: US 8,300,656 B2
(45) Date of Patent: Oct. 30, 2012

(54) TDMA RECEIVER

(75) Inventors: Fabien Buda, Paris (FR); Bertrand Debray, Maisons Laffitte (FR)

(73) Assignee: Juniper Networks, Inc., Sunnyvale, CA (US)

( * ) Notice: Subject to any disclaimer, the term of this patent is extended or adjusted under 35 U.S.C. 154(b) by 2824 days.

(21) Appl. No.: 10/359,218

(22) Filed: Feb. 6, 2003

(65) Prior Publication Data

US 2003/0185228 A1 Oct. 2, 2003

(30) Foreign Application Priority Data

Apr. 2, 2002 (EP) .................................. 02290815

(51) Int. Cl.
*H04L 12/43* (2006.01)
*H04J 3/06* (2006.01)
*H04B 7/212* (2006.01)
(52) U.S. Cl. .................. 370/458; 370/350; 370/442
(58) Field of Classification Search .............. 370/210, 370/347, 350, 442, 458, 478, 480, 487, 503, 370/343–345
See application file for complete search history.

(56) References Cited

U.S. PATENT DOCUMENTS

| 5,862,451 | A | 1/1999 | Grau et al. .................... 455/5.1 |
| 6,895,043 | B1 * | 5/2005 | Naegeli et al. ................ 375/224 |
| 2001/0055319 | A1 | 12/2001 | Quigley et al. |
| 2002/0154620 | A1 * | 10/2002 | Azenkot et al. ................ 370/347 |
| 2003/0021237 | A1 * | 1/2003 | Min et al. ........................ 370/252 |
| 2004/0028123 | A1 * | 2/2004 | Sugar et al. .................... 375/224 |

OTHER PUBLICATIONS

F. Buda et al.: "Design and Performance of a Fully-Digital DOCSIS CMTS Receiver," 2001 NCTA Technical Papers, pp. 212-220, Jun. 2001, Chicago, Illinois.

* cited by examiner

*Primary Examiner* — Michael Thier
*Assistant Examiner* — Feben M Haile
(74) *Attorney, Agent, or Firm* — Harrity & Harrity, LLP

(57) ABSTRACT

The TDMA receiver comprises a control unit for allocating to each of a plurality of transmitters time intervals during which the transmitter is allowed to transmit signals towards the TDMA receiver, a receiving unit for receiving an incoming signal resulting from the multiplexing of different signals which are output by the plurality of transmitters during the allocated time intervals and in the predetermined frequency band, the incoming signal thus consisting, in the predetermined frequency band, of a TDM signal, a processing unit for extracting and processing the TDM signal, and a spectrum determination unit for determining the spectrum of the incoming signal. The control unit is designed to synchronize the operation of the spectrum determination unit as a function of the time intervals allocated to the transmitters for the determination of the spectrum of the incoming signal in the predetermined frequency band.

19 Claims, 17 Drawing Sheets

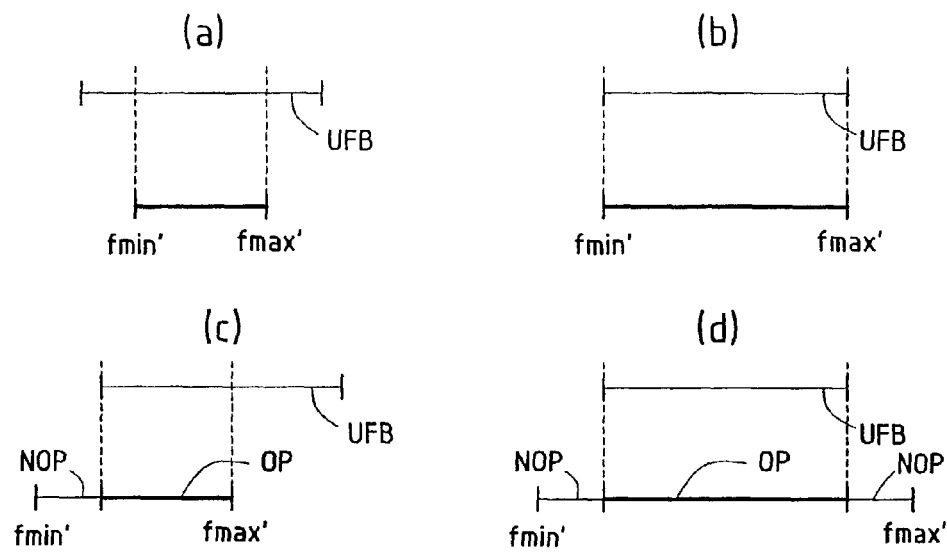
FIG.6
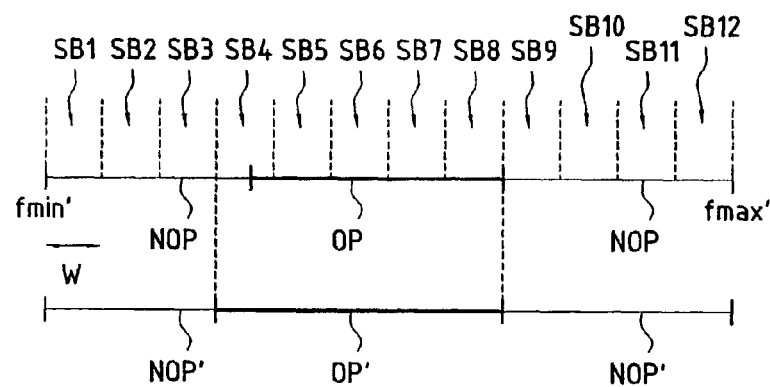
FIG.7
FIG.9
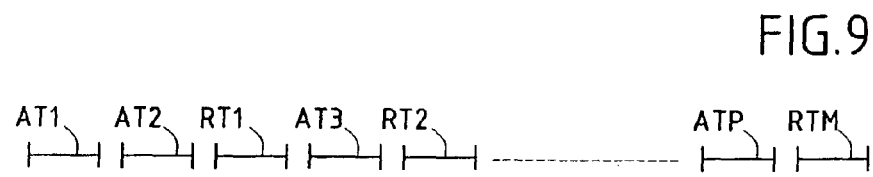

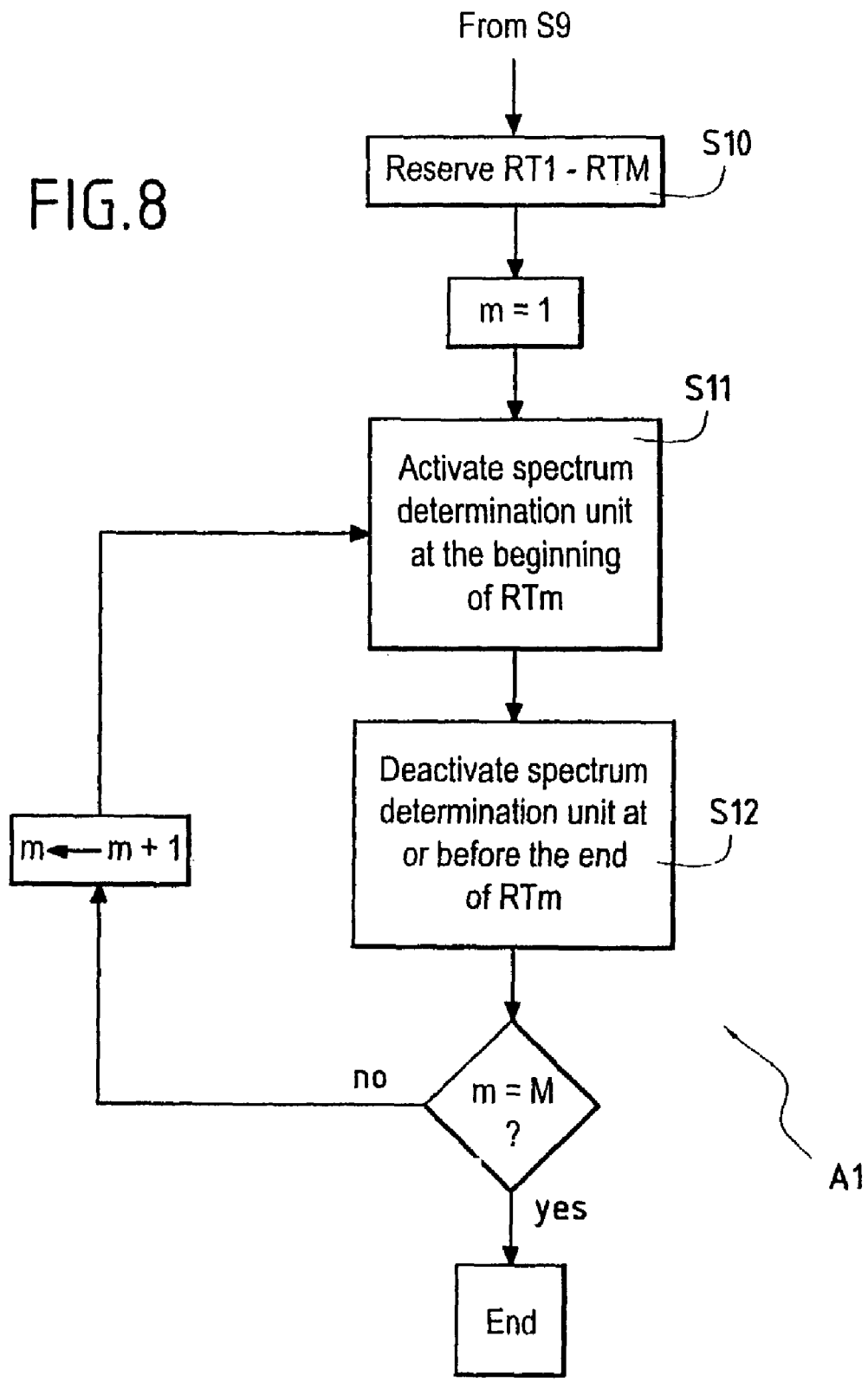

▨ Time interval during which a transmitter is allowed to transmit
☰ Time interval during which the first front-end and demodulation unit computes the noise spectrum
𝕀𝕀𝕀 Time interval during which the second front-end and demodulation unit computes the noise spectrum ▨ Time interval during which a transmitter is allowed to transmit ▥ Time interval during which the second front-end and demodulation unit computes the signal spectrum in channel 1

TDMA RECEIVER

CROSS-REFERENCE TO RELATED APPLICATIONS

This application claims priority under 35 U.S.C. §119(a) to European Application No. 012908156, entitled "TDMA RECEIVER," filed on Apr. 2, 2002, the contents of which are hereby incorporated by reference.

FIELD OF THE INVENTION

The present invention pertains to a TDMA (time-division multiplex access) receiver, and more particularly to a TDMA receiver that is capable of monitoring the spectrum of an incoming time-division multiplex signal.

According to one non-exclusive application of the present invention, the TDMA receiver forms the receiver of a CMTS (cable modem termination system) in an HFC (hybrid fiber/coax) network.

DESCRIPTION OF THE PRIOR ART

HFC networks are bidirectional networks using both optical fibers and electrical broadband coaxial cables. By virtue of their limited cost, these networks are currently preferred to fully optical fiber to the home (FTTH) systems which are however technically superior.

Most of HFC networks are of the tree and branch type, and comprise cable modems (CMs), provided at the subscribers' premises, and a head-end comprising a CMTS and an interface unit for interfacing with service providers, such as Internet service providers. Typically, two types of communication paths are involved in HFC networks, namely downstream paths from the CMTS to the cable modems and upstream paths from the cable modems to the CMTS. One spectrum band is reserved for each of these paths. By way of example, according to the Data Over Cable Service Interface Specification (DOCSIS), the spectrum bands reserved for upstream and downstream communications respectively are 5-42 MHz and 50-750 MHz. The upstream spectrum band is divided into several channels which are each defined by a predetermined carrier frequency and a predetermined frequency band (or sub-band). In the DOCSIS standard, the bandwidth of each channel is comprised between 200 kHz and 3200 kHz.

FIG. 1 diagrammatically shows the overall structure of an HFC network. In FIG. 1, the head-end is designated by the reference numeral 1, and the interface unit and the CMTS which are included in the head-end 1 are referenced 1a and 1b, respectively. Reference numeral 2 represents the cable modems in the subscribers' premises. The CMTS 1b and the cable modems 2 are connected to each other through a set of communication links 3, 3', opto-electronic conversion equipment 1c in the head-end 1, opto-electronic conversion nodes 4 remote from the head-end 1, bi-directional amplifiers 5, taps 6 and splitters/combiners 7. The communication links 3 between the opto-electronic conversion equipment 1c and the opto-electronic conversion nodes 4 are in the form of optical fibers, whereas the other communication links 3', including those connected to the subscribers' cable modems 2 and those between the opto-electronic conversion equipment 1c and the CMTS 1b, are constituted by electrical coaxial cables.

Upstream communications in an HFC network are usually based on a combined frequency-division multiple access (FDMA)/time-division multiple access (TDMA) scheme. Each cable modem is allocated one of the above-mentioned channels and time intervals in which it may transmit data bursts to the CMTS. The CMTS thus receives, on each communication link 3' to which it is directly connected, an incoming signal including an FDM/TDM (frequency-division multiplex/time-division multiplex) signal carrying the data from the cable modems. The FDM/TDM signal extends within the different frequency bands of the channels allocated to the cable modems and consists, in each of these frequency bands, of a TDM signal. The frequency bands of the allocated channels, which thus contain the useful signal, are also referred to as "useful signal frequency bands" by opposition to the remaining portion of the upstream spectrum band, which contains only noise and interferences.

One important function in the management of an HFC network is troubleshooting. Troubleshooting consists in monitoring the signal frequency spectrum in the upstream paths, in all or part of the upstream spectrum band, in order to detect troubles such as high level ingress noise and/or wideband noise. In practice, the monitoring is carried out at the CMTS using spectrum monitoring devices such as spectrum analyzers or spectrum monitoring boards connected to the upstream paths in parallel with the CMTS receiver. These spectrum monitoring devices generally compute an averaged spectrum signal, which gives only an overall view of the spectrum. No precise information can be provided, for example, on the spectrum of the signal transmitted from a specific cable modem or the spectrum of noise alone in a useful signal frequency band.

OBJECTS AND SUMMARY OF THE INVENTION

An object of the present invention consists in providing a TDMA receiver which may have a better knowledge of the spectrum of a received signal in at least a useful signal frequency band portion thereof.

To this end, there is provided, according to the invention, a TDMA receiver comprising:

control means for allocating to each of a plurality of transmitters time intervals during which the transmitter is allowed to transmit signals towards said TDMA receiver, receiving means for receiving an incoming signal resulting from the multiplexing of different signals which are output by said plurality of transmitters during said time intervals and in a predetermined frequency band, the incoming signal thus consisting, in the predetermined frequency band, of a TDM signal, processing means for extracting and processing the TDM signal included in the incoming signal, and spectrum determination means for determining the spectrum of the incoming signal, wherein the control means is designed to synchronize the operation of the spectrum determination means as a function of the time intervals allocated to the transmitters for the determination of the spectrum of the incoming signal in at least a portion of the predetermined frequency band.

By "TDMA receiver" it is meant here a receiver aimed at being incorporated in a system which uses TDMA. Such a system may be, for example, a pure TDMA system or an FDMA/TDMA system.

Thus, by synchronizing the operation of the spectrum determination means as a function of the time intervals allocated to the transmitters, it is possible to have the spectrum determination means determine the spectrum only during precise, well-defined time intervals which depend on the time intervals allocated to the transmitter so that a desired, specific spectral characteristic of the TDM signal may be obtained.

According to a first variant of the invention, the specific spectral characteristic is the spectrum of the noise and interferences in the predetermined frequency band portion. In this case, the synchronization consists in controlling the spectrum determination means so that the latter be active for the determination of the spectrum in at least the predetermined frequency band portion only during one or several reserved time intervals which are outside each of the time intervals allocated to the transmitters.

According to a second variant of the invention, the specific spectral characteristic is the spectrum of the TDM signal in the predetermined frequency band portion when transmission from the transmitters effectively occurs, but regardless of which transmitter(s) is (are) transmitting. In this case, the synchronization consists in controlling the spectrum determination means so that the latter be active for the determination of the spectrum in at least the predetermined frequency band portion only during one or several time intervals allocated to at least one transmitter among the plurality of transmitters.

In this second variant, the one or several time intervals during which the spectrum determination means is active for the determination of the spectrum in at least the predetermined frequency band portion may consist of one or several time intervals which are reserved for the spectrum determination, the control means being designed to allocate said reserved time intervals to the at least one transmitter and to request the at least one transmitter to transmit predetermined signals towards the TDMA receiver during these reserved time intervals.

According to a third variant of the invention, the specific spectral characteristic is the spectrum of the signal, within the TDM signal, which is output by a specific transmitter among the plurality of transmitters. In this case, the synchronization consists in controlling the spectrum determination means so that the latter be active for the determination of the spectrum in at least the predetermined frequency band portion only during one or several time intervals allocated to the specific transmitter.

In this third variant, the one or several time intervals during which the spectrum determination means is active for the determination of the spectrum in at least the predetermined frequency band portion may consist of one or several time intervals which are reserved for the spectrum determination, the control means being designed to allocate said reserved time intervals to the specific transmitter and to request the specific transmitter to transmit predetermined signals towards the TDMA receiver during said reserved time intervals.

Preferably, the processing means comprises an analog-to-digital converter for digitizing the incoming signal, and a digital front-end for extracting the TDM signal by performing baseband conversion and filtering operations on the digitized incoming signal for subsequent demodulation of the TDM signal.

The spectrum determination means may be a digital computation unit distinct from the digital front-end and connected to an output of the analog-to-digital converter to receive the digitized incoming signal.

Alternatively, in the case of the first variant mentioned above, the spectrum determination means may comprise the digital front-end of the processing means and a power estimator, the digital front-end being configurable by the control means to extract the TDM signal by performing baseband conversion and filtering operations on the digitized incoming signal during the time intervals allocated to the transmitters for subsequent demodulation of the TDM signal, and to compute, in association with the power estimator, the spectrum of the digitized incoming signal in at least the predetermined frequency band portion during the one or several reserved time intervals. In such a case, the power estimator may serve also to estimate, during the time intervals allocated to the transmitters, the power of the TDM signal for subsequent scaling thereof.

Typically, the TDMA receiver according to the invention further comprises an operator interface for selecting a frequency band in which the spectrum of the incoming signal is to be determined. If the selected frequency band has a portion in common with the predetermined frequency band portion, the synchronization will be performed at least for this common (overlapping) portion. In the variant where the spectrum determination means is distinct from the digital front-end, the synchronization is not needed for the portions of the selected frequency band which are outside the predetermined frequency band portion.

The present invention also provides an FDMA/TDMA receiver comprising:
control means for allocating to each of a plurality of transmitters one of a plurality of channels and time intervals in which the transmitter is allowed to transmit signals towards said FDMA/TDMA receiver, each of said channels having a predetermined frequency band,
receiving means for receiving an incoming signal resulting from the multiplexing of different signals output by said transmitters during said time intervals and transmitted in said channels, the incoming signal thus consisting, in each of the channel predetermined frequency bands, of a TDM signal,
a plurality of extracting means associated, respectively, with the plurality of channels, each of said extracting means being connected to an output of the receiving means for receiving said incoming signal and extracting therefrom the TDM signal corresponding to the respective channel for subsequent processing of the TDM signal, and
spectrum determination means for determining the spectrum of the incoming signal,
wherein the control means is designed to synchronize the operation of the spectrum determination means as a function of the allocated time intervals corresponding to a given channel for the determination of the spectrum of the incoming signal in at least a portion of the predetermined frequency band of the given channel.

Preferably, the receiving-means comprises an analog-to-digital converter for digitizing the incoming signal, and each extracting means comprises a digital front-end for performing baseband conversion and filtering operations on the digitized incoming signal so as to obtain the TDM signal corresponding to the respective channel for subsequent demodulation of said TDM signal.

The spectrum determination means may be a digital computation unit distinct from the digital front-ends of the plurality of extracting means and connected to an output of the analog-to-digital converter to receive the digitized incoming signal.

Alternatively, in the case where the operator wishes to monitor the spectrum of noise and interferences in the given channel, the spectrum determination means may comprise the digital front-end of the extracting means associated with the given channel and a power estimator, said digital front-end being configurable by the control means to extract the TDM signal corresponding to the given channel by performing baseband conversion and filtering operations on the digitized incoming signal during the allocated time intervals corresponding to the given channel for subsequent demodulation of the TDM signal, and to compute, in association with the power estimator, the spectrum of the digitized incoming signal in at least the precited portion of the predetermined frequency band of the given channel during one or several reserved time intervals which are outside each of the allocated time intervals corresponding to the given channel.

More specifically, the spectrum determination means may comprise the digital front-ends of the plurality of extracting means and a plurality of respective power estimators, each of said digital front-ends being configurable by the control means to extract the TDM signal corresponding to the respective channel by performing baseband conversion and filtering operations on the digitized incoming signal during the corresponding allocated time intervals for subsequent demodulation of the TDM signal, and to compute, during one or several reserved time intervals which are outside each of the allocated time intervals corresponding to the respective channel, and in association with the respective power estimator, the spectrum of the digitized incoming signal in at least a portion of the frequency band of the respective channel.

According to another arrangement, the control means is designed to reserve, for each of the plurality of channels, time intervals which are outside each of the allocated time intervals corresponding to this channel, the reserved time intervals of each of the plurality of channels coinciding with the reserved time intervals of any other one of the plurality of channels, and the spectrum determination means comprises the digital front-ends of the plurality of extracting means and a plurality of respective power estimators, each of said digital front-ends being configurable by the control means to extract the TDM signal corresponding to the respective channel by performing baseband conversion and filtering operations on the digitized incoming signal during the corresponding allocated time intervals for subsequent demodulation of the TDM signal, and to compute, during the reserved time intervals, and in association with the respective power estimator, the spectrum of the incoming signal in at least a portion of the predetermined frequency band of one of the plurality of channels.

The present invention further provides an HFC network comprising at least one TDMA receiver or at least one FDMA/TDMA receiver as defined above.

The present invention further provides a method for operating a TDMA receiver, said TDMA receiver comprising:
control means for allocating to each of a plurality of transmitters time intervals during which the transmitter is allowed to transmit signals towards said TDMA receiver,
receiving means for receiving an incoming signal resulting from the multiplexing of different signals which are output by said plurality of transmitters during said time intervals and in a predetermined frequency band, the incoming signal thus consisting, in the predetermined frequency band, of a TDM signal,
processing means for extracting and processing the TDM signal included in the incoming signal, and
spectrum determination means for determining the spectrum of the incoming signal,
the method comprising the step of causing the control means to synchronize the operation of the spectrum determination means as a function of the time intervals allocated to the transmitters for the determination of the spectrum of the incoming signal in at least a predetermined portion of said frequency band.

The present invention further provides a method for operating an FDMA/TDMA receiver, said FDMA/TDMA receiver comprising:
control means for allocating to each of a plurality of transmitters one of a plurality of channels and time intervals in which the transmitter is allowed to transmit signals towards said FDMA/TDMA receiver, each of said channels having a predetermined frequency band,
receiving means for receiving an incoming signal resulting from the multiplexing of different signals output by said transmitters during said time intervals and transmitted in said channels, the incoming signal thus consisting, in each of the channel predetermined frequency bands, of a TDM signal,
a plurality of extracting means associated, respectively, with the plurality of channels, each of said extracting means being connected to an output of the receiving means for receiving said incoming signal and extracting therefrom the TDM signal corresponding to the respective channel for subsequent processing of the TDM signal, and
spectrum determination means for determining the spectrum of the incoming signal,
the method comprising the step of causing the control means to synchronize the operation of the spectrum determination means as a function of the allocated time intervals corresponding to a given channel for the determination of the spectrum of the incoming signal in at least a portion of the predetermined frequency band of the given channel.

BRIEF DESCRIPTION OF THE DRAWINGS

In the annexed drawings:
FIG. 6 illustrates different configurations of a selected frequency band and a useful signal frequency band;
FIG. 7 illustrates the conversion of an overlapping portion of the selected frequency band and the useful signal frequency band into an overlapping portion whose width is a multiple of a spectrum computation resolution;
FIG. 8 shows a first sub-algorithm of the algorithm of FIG. 5;
FIG. 9 illustrates reserved time intervals inserted between allocated time intervals in the sub-algorithm of FIG. 8.

DETAILED DESCRIPTION OF PREFERRED EMBODIMENTS OF THE INVENTION

Figure 2:
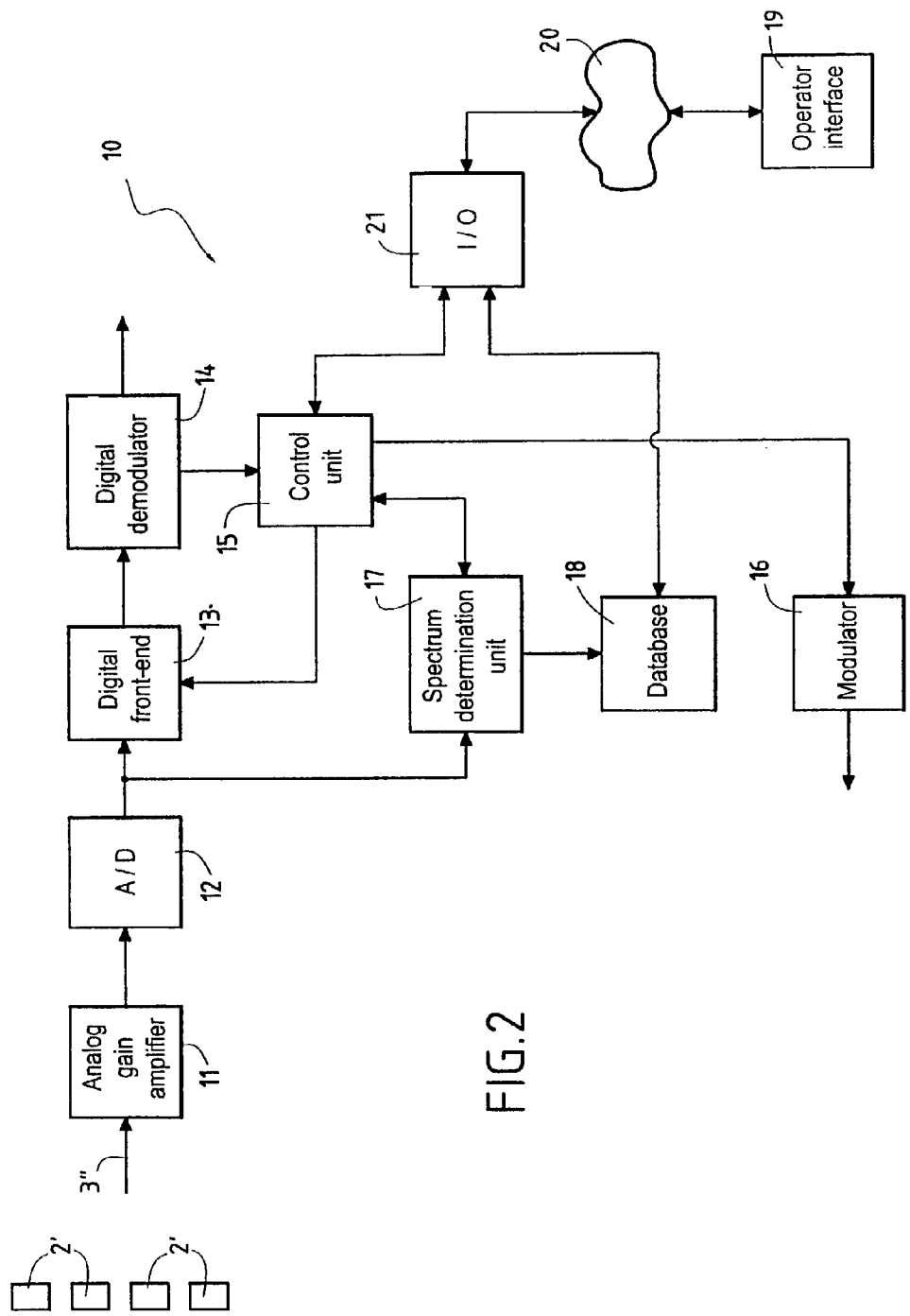
FIG. 2 is a block-diagram showing a TDMA receiver according to a first embodiment of the invention.

With reference to FIG. 2, a TDMA (time-division multiplex access) receiver, 10, according to a first embodiment of the present invention receives an incoming signal from a communication link 3". The communication link 3", at the level of the TDMA receiver 10, is typically in the form of a coax cable.

Figure 1:
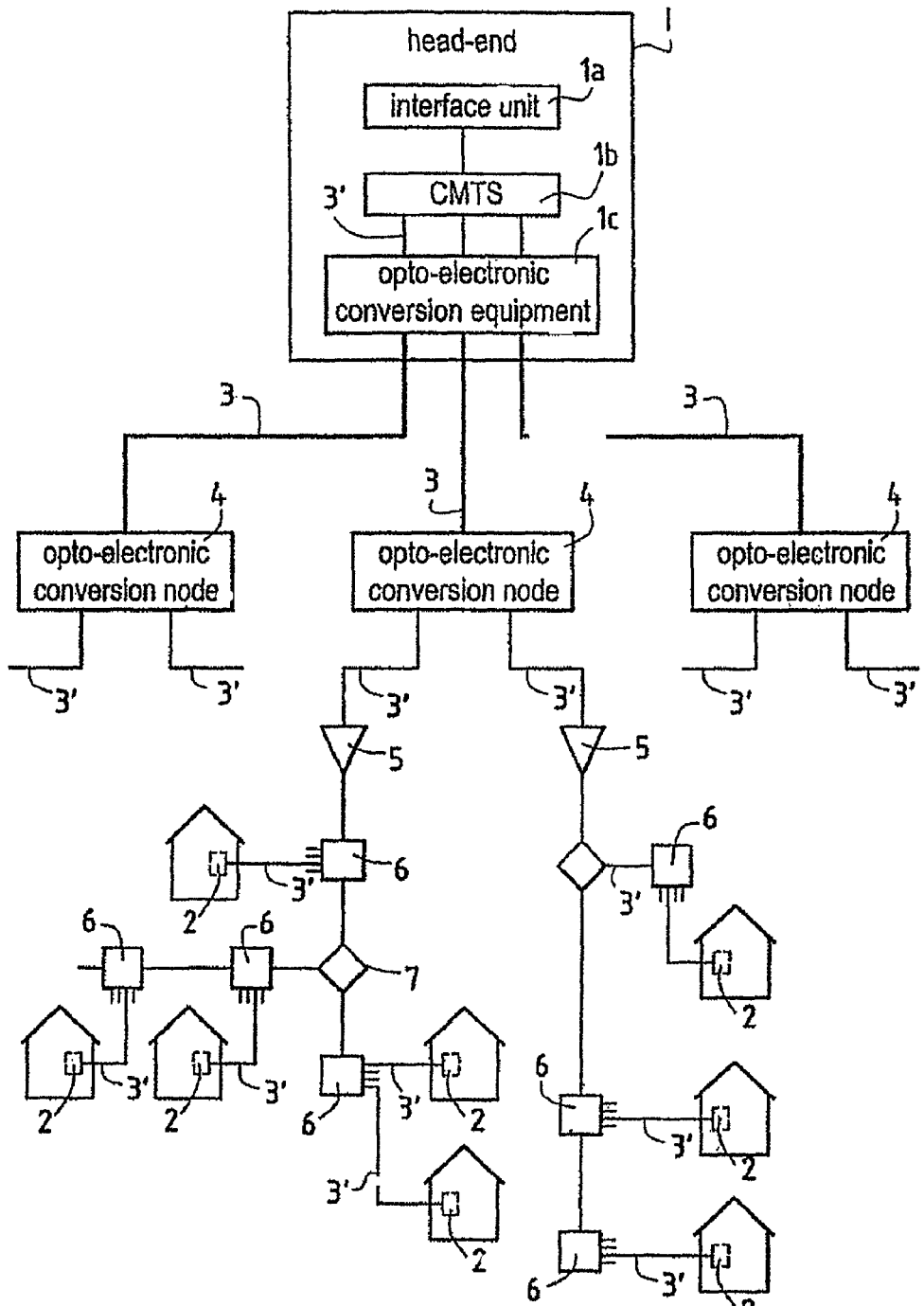
FIG. 1, already discussed, diagrammatically shows the structure of an HFC network.

The incoming signal results from the multiplexing of different data signals output by transmitters 2', which may be the cable modems 2 of FIG. 1 when the TDMA receiver 10 is used in a CMTS of an HFC network. The data signals output by the transmitters 2' are transmitted towards the receiver 10 in a same channel defined by a predetermined carrier frequency and a predetermined frequency band. The incoming signal thus consists, in the predetermined frequency band, of a TDM signal which is composed of a useful TDM signal, noise and interferences. Outside the predetermined frequency band, the incoming signal consists of noise and interferences (it is assumed here that only one channel is used for the data transmission from the transmitters 2'). As the predetermined channel frequency band is the band where the useful signal is present, this band is also called "useful signal frequency band".

The TDMA receiver 10 comprises, in a known manner, an analog gain amplifier 11 for amplifying the incoming signal and an analog-to-digital converter 12 for digitizing the amplified signal output by the amplifier 11. A butterworth filter (not shown) may also be provided downstream of the amplifier 11. The digitized signal delivered by the analog-to-digital converter 12 is converted into a signal suitable for demodulation by a digital front-end 13. A digital demodulator 14 receives said signal suitable for demodulation and delivers a corresponding demodulated signal which is then transmitted to a core network (not shown) via, for example, an Ethernet network.

Figure 3:
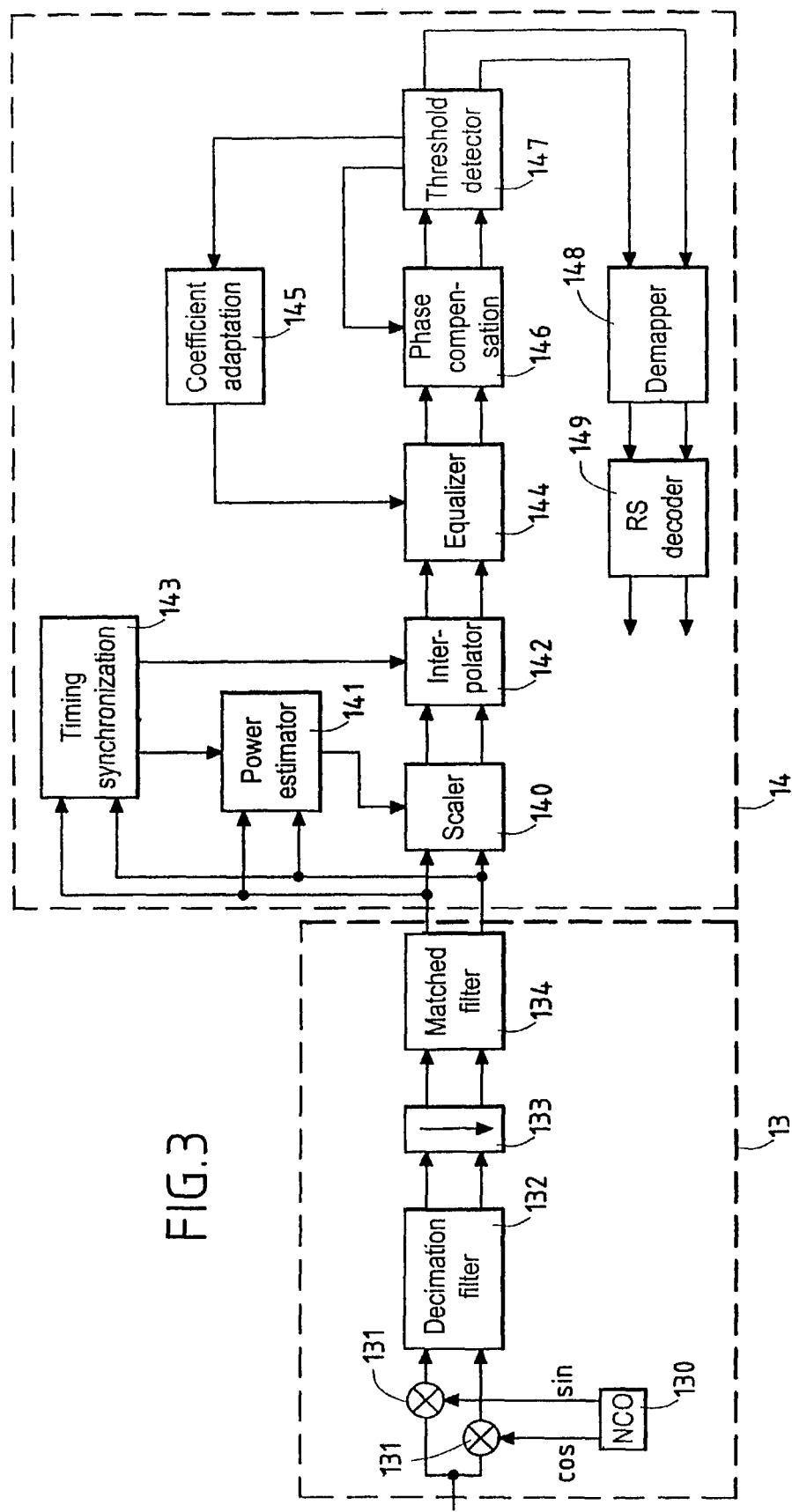
FIG. 3 is a block-diagram showing a digital front-end and a digital demodulator used in the TDMA receiver according to the first embodiment.

As shown in FIG. 3, the digital front-end 13 comprises a numerically controlled oscillator 130 and multipliers 131 for baseband converting the TDM signal included in the digitized signal output by the analog-to-digital converter 12 and dividing the latter signal into in-phase and quadrature components, a decimation filter 132, a decimator 133 and a matched filter 134. The elements 132, 133 and 134 form together a low-pass filter whose bandwidth is substantially equal to the width of the useful signal frequency band of the incoming signal, i.e. the frequency band of the TDM signal. Such a low-pass filter serves to extract the TDM signal.

Still referring to FIG. 3, the digital demodulator 14 comprises a scaler 140 controlled by a power estimator 141 for setting the power of the digital signal delivered by the front-end 13 to a predetermined value. The digital demodulator 14 further comprises an interpolator 142, a timing synchronization unit 143 controlling the interpolator 142 and the power estimator 141, an equalizer 144 with a coefficient adaptation unit 145, a phase compensation unit 146, a threshold detector 147, a demapper 148 and an RS decoder 149. Each functional block illustrated in FIG. 3 is known per se. Further details concerning the architecture of FIG. 3 may be found in the paper entitled "Design and Performance of a Fully-Digital DOCSIS CMTS Receiver", by F. Buda et al., 2001 NCTA Technical Papers, pp. 212-220, June 2001, Chicago, Ill.

Returning to FIG. 2, the TDMA receiver 10 further comprises a control unit 15 which controls the operation of the receiver 10 and manages the time-division access of the transmitters 2' in the above-mentioned channel. The control unit 15 is preferably in the form of a microprocessor storing and executing a scheduling program. The control unit 15 receives resource allocation requests from the transmitters 2' and, in response, allocates to the transmitters 2', via a modulator 16 and under the control of the scheduling program, time intervals or time slots during which the transmitters 2' will be allowed to transmit traffic data in the channel. Each transmitter 2' is thus allocated time intervals in which it may send traffic data signals. Outside these allocated time intervals, the transmitter is not allowed to transmit. The signals output by the transmitters 2' are multiplexed in the network to which the receiver 10 belongs to produce the above-mentioned TDM signal which forms part of the incoming signal received by the receiver 10.

The TDMA receiver 10 further comprises a spectrum determination unit 17 for computing the spectrum, i.e. typically the power spectral density, of a selected frequency band of the incoming signal received from the communication link 3", and a database memory 18 for storing the spectrum computation results obtained by the spectrum determination unit 17. The selected frequency band is specified by an operator through an operator interface 19 connected to the control unit 15 via a network 20 such as the Internet or an Ethernet network and an input/output interface 21 of the receiver 10. The operator interface 19 is typically a computer, for example a PC.

The spectrum determination unit 17 is connected to the output of the analog-to-digital converter 12 so as to receive the digitized incoming signal. The spectrum determination unit 17 may be a processor or a dedicated circuit in which is implemented a known spectrum computation technique. One example of such a known spectrum computation technique is the Fast Fourier Transform (FFT). Another example which, in the present invention, is preferred to the FFT, is shown in FIGS. 4A and 4B.

Figure 4A:
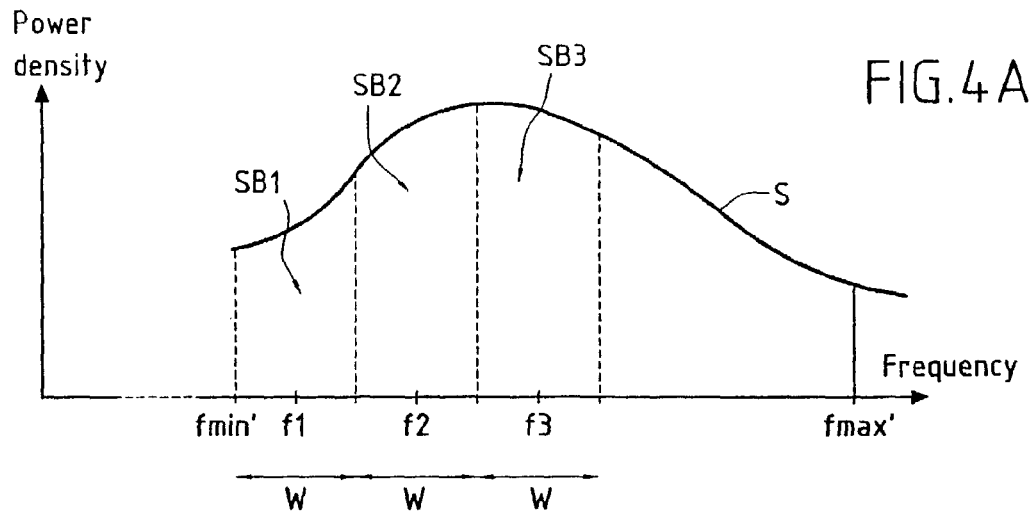
FIGS. 4A and 4B illustrate a known technique for computing the spectrum of a given signal.
Figure 4B:
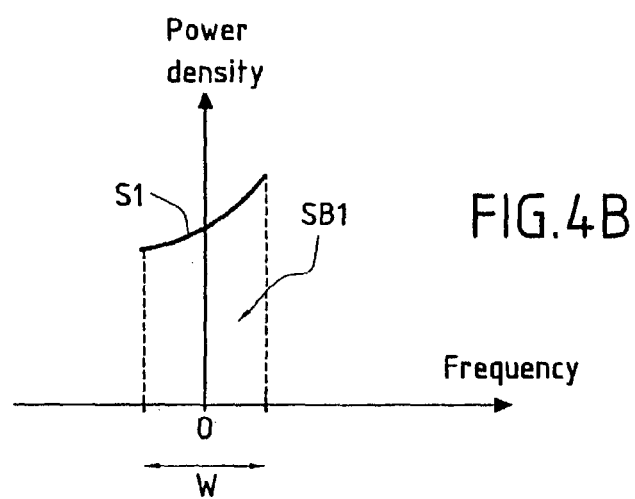

In FIG. 4A is represented a digital signal S the spectrum of which is to be determined in a predetermined frequency band [fmin', fmax']. The frequency band [fmin', fmax'] is divided into a plurality of sub-bands bands SB1, SB2, SB3, etc. (delimited by the dashed lines in FIG. 4A) respectively having center frequencies f1, f2, f3, etc. The width W of each sub-band SBi is the spectrum computation resolution. Then, as shown in FIG. 4B for the first sub-band SB1, each sub-band is baseband converted and extracted from the other sub-bands. The baseband conversion of each sub-band SBi is performed by multiplying the digital signal S by a complex signal having the corresponding frequency—fi, as is well known in the art. The extraction operation of each sub-band SBi is performed by filtering the digital signal S with a low-pass filter having the bandwidth W after the baseband conversion of the sub-band. Next, for each sub-band SBi, the power density Pi of the signal Si resulting from the baseband conversion and low-pass filtering operations (only the signal S1 corresponding to the sub-band SB1 is illustrated in FIG. 4B) is estimated according to the following formula:

$$Pi = \frac{\sum_{j=1}^{N} xi_j^2}{C}$$

where C is a normalization coefficient which depends on the number N, the resolution W, the analog gain of the amplifier 11 and the processing gains of the circuits 12 and 13, $xi_j$ are the signal samples of the signal Si, and N is the number of samples which are taken into account for the computation of the power density Pi (the greater N the more accurate and the more time-consuming the power density estimation). The couples of values (fi, Pi) which are thus obtained form the spectrum of the signal S in the frequency band [fmin', fmax'].

Figure 4C:
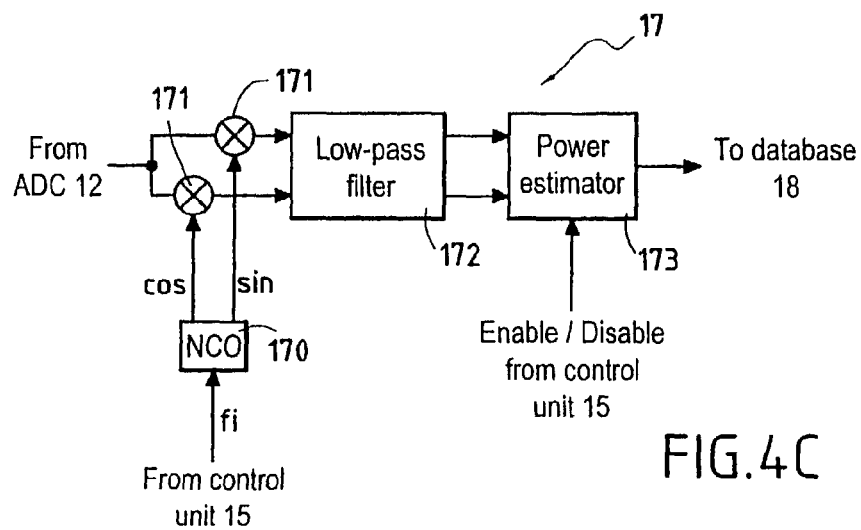
FIG. 4C is a block-diagram showing a spectrum computation device capable of performing the technique illustrated in FIGS. 4A and 4B.

FIG. 4C shows a typical structure for the spectrum determination unit 17 in the preferred variant where the technique illustrated in FIGS. 4A and 4B is used for computing the spectrum. The main components of this structure are a numerically controlled oscillator 170 and multipliers 171 for performing the above-mentioned baseband conversion of each sub-band SBi, a low-pass filter 172 having the bandwidth W for extracting each sub-band SBi from the other sub-bands and a power estimator 173 for estimating the power densities Pi.

According to the invention, the spectrum determination unit 17 is controlled by the control unit 15 and its operation may be synchronized as a function of the time intervals allocated to the transmitters 2' for the determination of the spectrum of the TDM signal in at least a portion of the useful signal frequency band. Preferably, the said "at least a portion of the useful signal frequency band" consists of the whole useful signal frequency band. Thus, in practice, the synchronization is activated when the frequency band selected by the operator is within, or coincides with, the useful signal frequency band of the incoming signal, or more generally when this selected frequency band has a portion in common with the useful signal frequency band. In the latter case, the synchronization is performed only for the portion in common. For the portions of the selected frequency band which are outside the useful signal frequency band, the synchronization is not needed.

Figure 5:
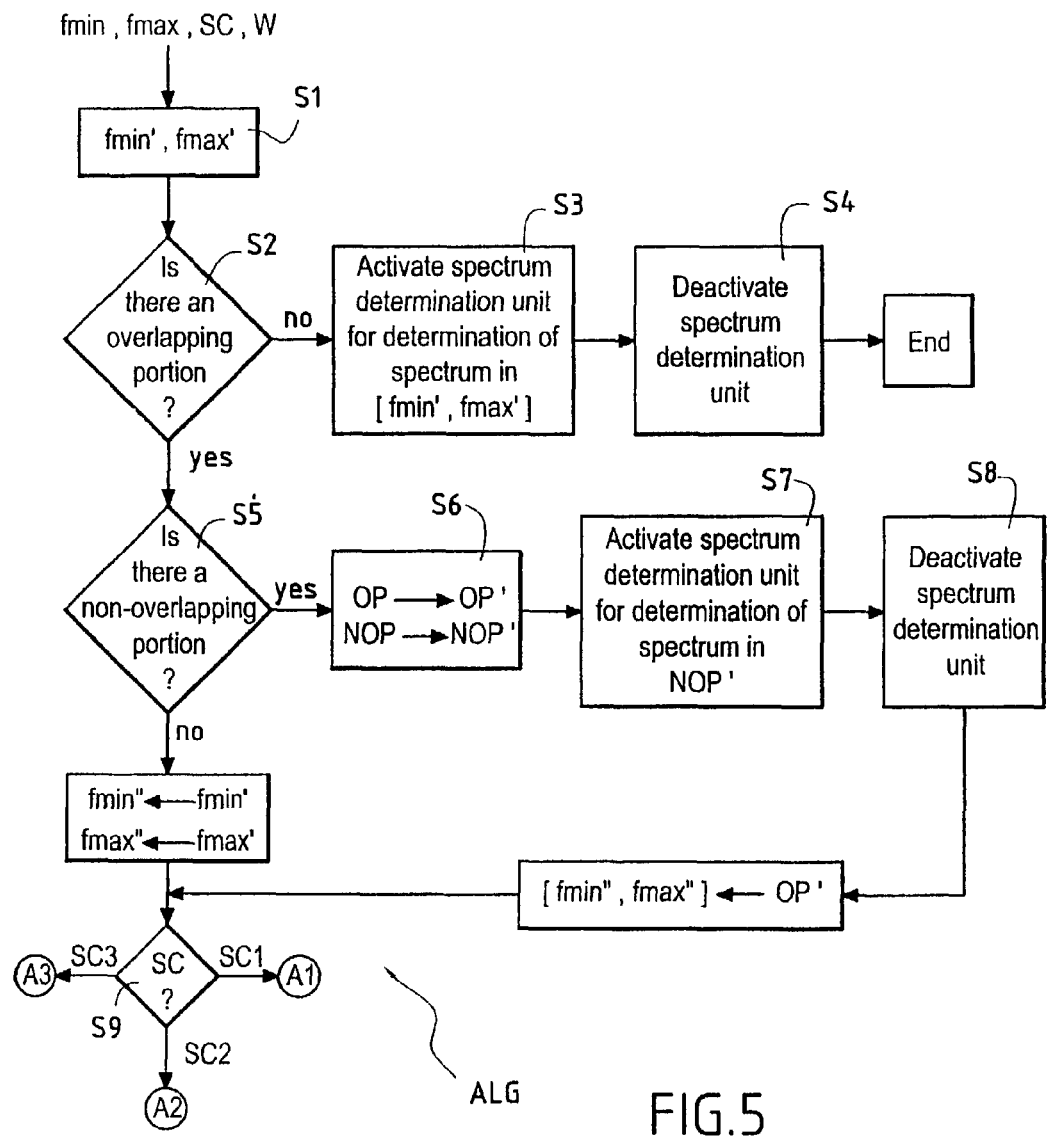
FIG. 5 shows an algorithm performed in the TDMA receiver according to the first embodiment of the invention.

FIG. 5 shows an algorithm ALG executed by the control unit 15 and incorporating the synchronization process according to the invention.

In a first step S1 of the algorithm ALG, the control unit 15 receives from the operator interface 19 the following information:
  the spectrum computation resolution W,
  the minimum value, fmin, of the frequency band in which the operator wishes the spectrum of the incoming signal to be computed,
  the maximum value, fmax, of this frequency band, and if the frequency band [fmin, fmax] has a portion in common with the useful signal frequency band:
  information SC indicating which spectral characteristic is to be computed among the following three ones:
    SC1: the power spectral density of the noise and interferences present in the TDM signal, i.e. in the useful signal frequency band of the incoming signal,
    SC2: the power spectral density of the TDM signal when at least one transmitter 2' is transmitting, regardless of which transmitter(s) 2' is (are) transmitting, and
    SC3: the power spectral density of the signal, within the TDM signal, which is output by a specific transmitter 2' (an identifier of the specific transmitter is in this case provided by the operator interface 19 to the control unit 15).

In this first step, if the width of the selected frequency band [fmin, fmax] is not a multiple of the above-mentioned computation resolution W, the control unit 15 transforms the selected frequency band [fmin, fmax] into a frequency band [fmin', fmax'] satisfying the following conditions:
  fmin'≦fmin,
  fmax'≧fmax, and
  (fmax'−fmin') is a multiple of the spectrum computation resolution W.

In a second step S2, it is determined whether the frequency band [fmin', fmax'] and the useful signal frequency band of the incoming signal have a portion in common. Such a portion in common will be referred to in the following as an overlapping portion. If there is no overlapping portion, which means that the operator wishes to monitor the spectrum of the incoming signal in a band outside the useful signal frequency band (such a band will contain only noise and interferences if only one channel exists), the control unit 15 goes to a step S3.

In step S3, the control unit 15 activates the spectrum determination unit 17 so that the latter computes the spectrum of the incoming signal in the frequency band [fmin', fmax']. More specifically, in the preferred variant of this first embodiment, the control unit 15 sequentially provides the center frequencies f1, f2, f3, etc. of the respective sub-bands SB1, SB2, SB3, etc. (see FIG. 4A) to the numerically controlled oscillator 170 (see FIG. 4C). After having provided the first center frequency f1 to the numerically controlled oscillator 170, the control unit 15 sends an enable command to the power estimator 173 to activate the power estimation operation. For each frequency fi, the power estimator 173 estimates the power density Pi of the filtered signal output by the low-pass filter 172, which corresponds to the power density of the incoming signal in the sub-band SBi, and stores the couple (fi, Pi) thus obtained in the database 18. The power estimator 173 is reinitialized before each power density computation. After having provided the last frequency fi=fmax'−(W/2) to the numerically controlled oscillator 170 and after the power estimator 173 has finished the power estimation corresponding to this last frequency, the control unit 15 sends a disable command to the power estimator 173, in a step S4, so as to deactivate the spectrum determination unit 17. At the end of step S4, the operator computer 19 may fetch the data stored in the database 18 via the network 20 and the input/output interface 21 and display the values (fi, Pi).

If, in step S2, it is determined that the frequency band [fmin', fmax'] has a portion in common with the useful signal frequency band, the control unit 15 goes to a step S5. In step S5 is determined whether the frequency band [fmin', fmax'] has a portion outside the useful signal frequency band. Such a portion will be called a non-overlapping portion. By way of illustration, FIG. 6 shows different possible configurations for the frequency band [fmin', fmax'] with respect to the useful signal frequency band, designated by UFB. In FIG. 6, the overlapping portion is represented by a thick line on the frequency band [fmin', fmax']. FIG. 6 more specifically represents four different cases, namely:
  the frequency band [fmin', fmax'] is within the useful signal frequency band UFB (FIG. 6(a)), the frequency band [fmin', fmax'] coincides with the useful signal frequency band UFB (FIG. 6(b)), the frequency band [fmin', fmax'] has an overlapping portion OP and a continuous non-overlapping portion NOP (FIG. 6(c)), and the frequency band [fmin', fmax'] has an overlapping portion OP and a discontinuous non-overlapping portion NOP (FIG. 6(d)).

Thus, if it is determined in step S5 that the frequency band [fmin', fmax'] has a non-overlapping portion NOP, which corresponds to either of cases (c) and (d) in FIG. 6, the control unit 15 executes steps S6, S7 and S8. If, on the other hand, no non-overlapping portion NOP exists, which corresponds to either of cases (a) and (b) in FIG. 6, the control unit goes to a step S9.

Steps S6, S7 and S8 aim at computing the spectrum of the non-overlapping portion NOP of the incoming signal. In step S6, the overlapping portion OP and the non-overlapping portion NOP are respectively converted into an overlapping portion OP' whose width is a multiple of the spectrum computation resolution W and a non-overlapping portion NOP' whose width is also a multiple of the resolution W. FIG. 7 shows, by way of example, an overlapping portion OP and a two-part non-overlapping portion NOP corresponding to the case (d) of FIG. 6, as well as sub-bands SB1 to SB12 having the width W and subdividing the frequency band [fmin', fmax']. In FIG. 7, the sub-bands SB1 to SB 12 are delimited by dashed lines. The first part of the non-overlapping portion NOP is composed of the first three sub-bands SB1 to SB3 and a portion of the fourth sub-band SB4. The overlapping portion OP is composed of the remaining portion of the sub-band SB4, and the sub-bands SB5 to SB8. The second part of the non-overlapping portion NOP is composed of the last four sub-bands SB9 to SB12. The overlapping portion OP is converted into the overlapping portion OP', which is composed of the sub-bands SB4 to SB8. The non-overlapping portion NOP is converted into the non-overlapping portion NOP', which is constituted by a first part composed of the sub-bands SB1 to SB3 and of a second part composed of the sub-bands SB9 to SB12.

Steps S7 and S8 are performed in a manner similar to steps S3 and S4, i.e. the control unit 15 activates the spectrum determination unit 17 and provides the center frequencies fi of the non-overlapping portion NOP' to the oscillator 170 (in the case of FIG. 7, these center frequencies are f1, f2, f3 and f9 to f12), and then deactivates the spectrum determination unit 17 once all couples (fi, Pi) for the non-overlapping portion NOP' have been determined. After the step S8 has been executed, the control unit 15 passes to the step S9 for subsequent computation of the spectrum of the overlapping portion OP'.

In step S9, it is determined whether the spectral characteristic SC selected by the operator is the spectral characteristic SC1, SC2 or SC3. In the first case, the control unit 15 executes a sub-algorithm A1. In the second case, the control unit 15 executes a sub-algorithm A2. In the third case, the control unit 15 executes a sub-algorithm A3.

The sub-algorithm A1 is illustrated in FIG. 8. In a step S10, the control unit 15 reserves, for the spectrum computation, one or several time intervals in the TDMA scheme in which no transmission will be allowed from the transmitters 2'. The reserved time intervals preferably have the same length. This length is not less than the time required to compute a predetermined number of couple(s) (fi, Pi). The number of reserved time interval(s) must be sufficient for computing all couples (fi, Pi) corresponding to the band in which the spectrum is to be computed. This band, denoted [fmin", fmax"], corresponds to the band [fmin', fmax'] in the case where step S9 is executed after step S5 (see FIG. 5) and to the overlapping portion OP' in the case where step S9 is executed after step S8. In the case where plural reserved time intervals are provided, i.e. if the number of couples corresponding to the band [fmin", fmax"] is greater than the predetermined number of couple(s), the reserved time intervals are inserted between time intervals allocated to the transmitters 2' for transmission of traffic data bursts in order not to interrupt the transmission from the transmitters 2' for too long a time. FIG. 9 shows, by way of illustration, a plurality of reserved time intervals RT1 to RTM inserted between a plurality of allocated time intervals AT1 to ATP. During the reserved time intervals RT1 to RTM, the transmitters 2' are not allowed to transmit. During each allocated time interval AT1 to ATP, a transmitter 2' is allowed to transmit.

The rate of the reserved time intervals depends on which speed is desired for the determination of the spectrum of the frequency band [fmin", fmax"]. In a general manner, priorities may be defined. If a higher priority is given to the spectrum computation, with respect to the traffic data transmission from the transmitters 2', the rate of the reserved time intervals will be high. If, on the contrary, a higher priority is given to the data transmission from the transmitters 2', the rate of the reserved time intervals will be low.

Step S10 is followed by steps S11 and S12 which are first described below in the case of plural reserved time intervals RT1 to RTM (M≠1). The control unit 15 activates the spectrum determination unit 17 at or just after the beginning of the first reserved time interval RT1. More specifically, the control unit 15 provides the first center frequency f1 corresponding to the frequency band [fmin", fmax"] to the oscillator 170 at or just after the beginning of the first reserved time interval RT1, and then enables the power estimator 173 and sequentially provides other center frequencies f2, f3, etc. to the oscillator 170. Once the predetermined number of couple(s) (fi, Pi) has (have) been obtained in the first reserved time interval RT1 (this moment may correspond to the end of the first reserved time interval or to an instant before this end), the control unit 15 deactivates the spectrum determination unit 17 through disabling the power estimator 173. Steps S11 and S12 are then repeated for the other reserved time intervals RT2 to RTM until all couples (fi, Pi) corresponding to the frequency band [fmin", fmax"] are obtained.

Steps S11 and S12 are now described in the case of a single reserved time interval RT1 (M=1 and the predetermined number of couple(s) is equal to the number of all couples (fi, Pi)). The control unit 15 activates the spectrum determination unit 17 at or just after the beginning of the reserved time interval RT1. More specifically, the control unit 15 provides the first center frequency f1 corresponding to the frequency band [fmin", fmax"] to the oscillator 170 at or just after the beginning of the reserved time interval RT1, and then enables the power estimator 173 and sequentially provides the other center frequencies f2, f3, etc. to the oscillator 170. Once all couples (fi, Pi) corresponding to the frequency band [fmin", fmax"] have been obtained (this moment may correspond to the end of the reserved time interval or to an instant before this end), the control unit 15 deactivates the spectrum determination unit 17 through disabling the power estimator 173.

In the above two cases, the spectrum computation for the frequency band [fmin", fmax"] is carried out only during one or reserved time interval(s) in which the transmitters 2' are not allowed to transmit and which is (are) thus outside the time intervals allocated for transmission from the transmitters 2'. In other words, the spectrum determination unit 17 is active during the reserved time interval(s) and inactive outside this (these) reserved time interval(s), in particular during the time intervals allocated to the transmitters 2'. As no data are transmitted from the transmitters 2' to the TDMA receiver 10 during this (these) reserved time interval(s), the spectrum values (fi, Pi) obtained are representative of the noise and interferences present in the useful signal frequency band of the channel.

Figure 10:
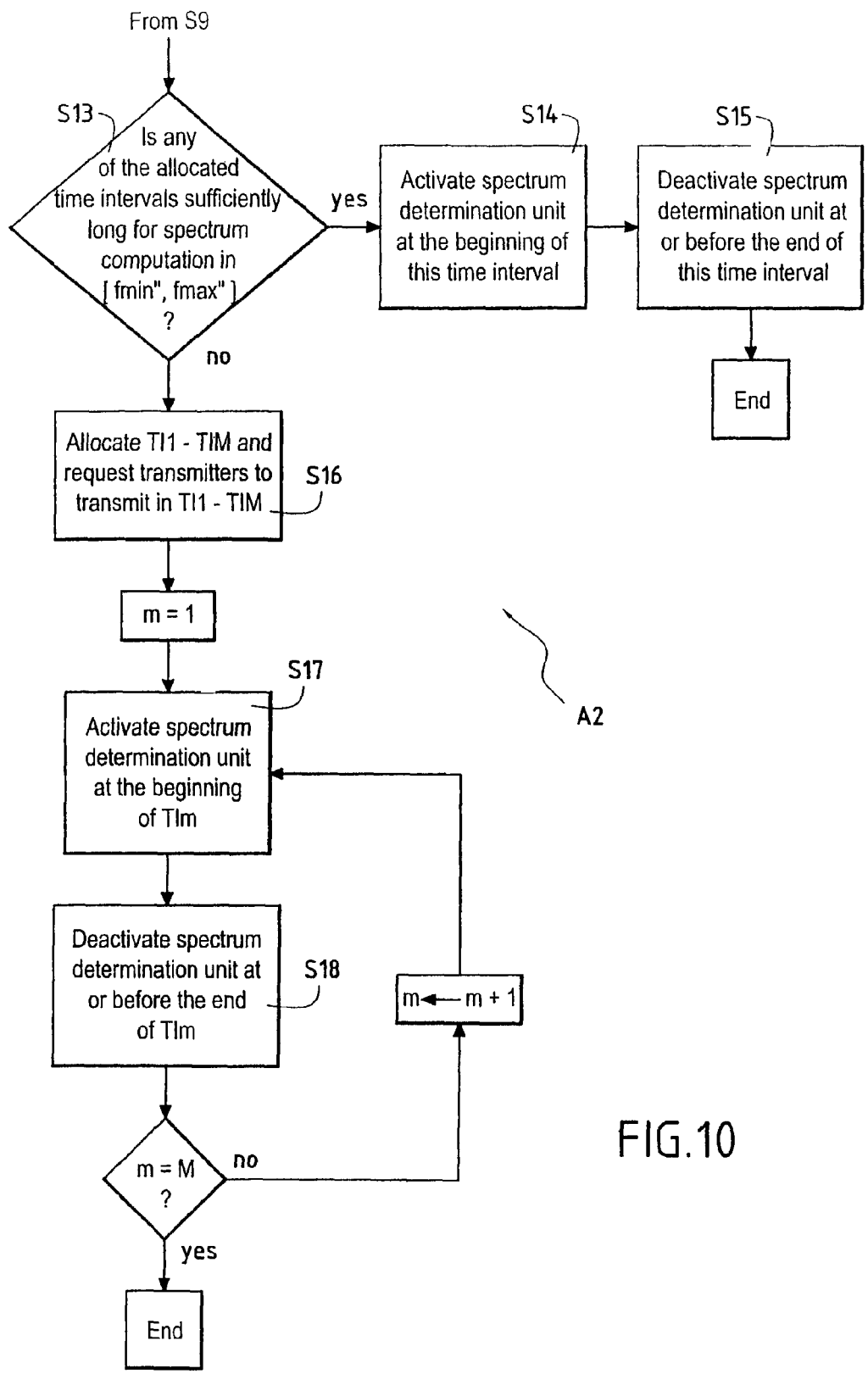
FIG. 10 shows a second sub-algorithm of the algorithm of FIG. 5.

The sub-algorithm A2 is illustrated in FIG. 10. In a first step S13, the control unit 15 determines whether time intervals have already been allocated to transmitters 2' for future traffic data transmissions therefrom and, if the check result is positive, whether any of these time intervals has a length which is not less than the time required to compute the spectrum of the incoming signal in the frequency band [fmin", fmax"]. If such an allocated time interval exists, the control unit 15 activates the spectrum determination unit 17 at or just after the beginning of this allocated time interval (step S14). More specifically, the control unit 15 provides the first center frequency f1 corresponding to the frequency band [fmin", fmax"] to the oscillator 170 at or just after the beginning of this allocated time interval, and then enables the power estimator 173 and sequentially provides the other center frequencies f2, f3, etc. to the oscillator 170. Once all couples (fi, Pi) corresponding to the frequency band [fmin", fmax"] have been obtained (this moment may correspond to the end of the allocated time interval or to an instant before this end), the control unit 15 deactivates the spectrum determination unit 17 through disabling the power estimator 173.

If, on the hand, step S13 determines that no time interval has been allocated for future traffic data transmission from the transmitters 2' (i.e. no request has recently been made in this respect by the transmitters 2') or that time intervals have been allocated but none of them has a length sufficient for computation of the spectrum of the TDM signal in the frequency band [fmin", fmax"], a step S16 is executed, in which one or several time intervals TI1 to TIM are reserved for this computation. The reserved time intervals TI1 to TIM are outside the time intervals allocated to the transmitters 2' for traffic data transmission to the TDMA receiver 10. The number, rate and length of these reserved time intervals are chosen according to the same criteria as exposed above for step S10.

After the time intervals TI1 to TIM have been reserved, the control unit 15 allocates each of them to a transmitter 2', which may be selected arbitrarily, and requests each of the selected transmitters 2' to send a message of a predetermined length during the corresponding allocated, reserved time interval. Next, in steps S17 and S18, the control unit 15 controls the spectrum determination unit 17 so that the spectrum of the frequency band [fmin", fmax"] be computed only during the allocated, reserved time intervals TI1 to TIM. Steps S17 and S18 are performed in a manner similar to previously described steps S11 and S12.

In the sub-algorithm A2, as the spectrum values (fi, Pi) are computed only during time intervals in which transmitters 2' effectively transmit data (these data may be either traffic data, in the case of steps S14 and S15, or predetermined messages, in the case of steps S16 to S18), these spectrum values will provide a faithful and reliable representation of the spectrum of the TDM signal, in contrast with the prior art, which cannot guarantee that transmitters are transmitting during the spectrum computation.

Figure 11:
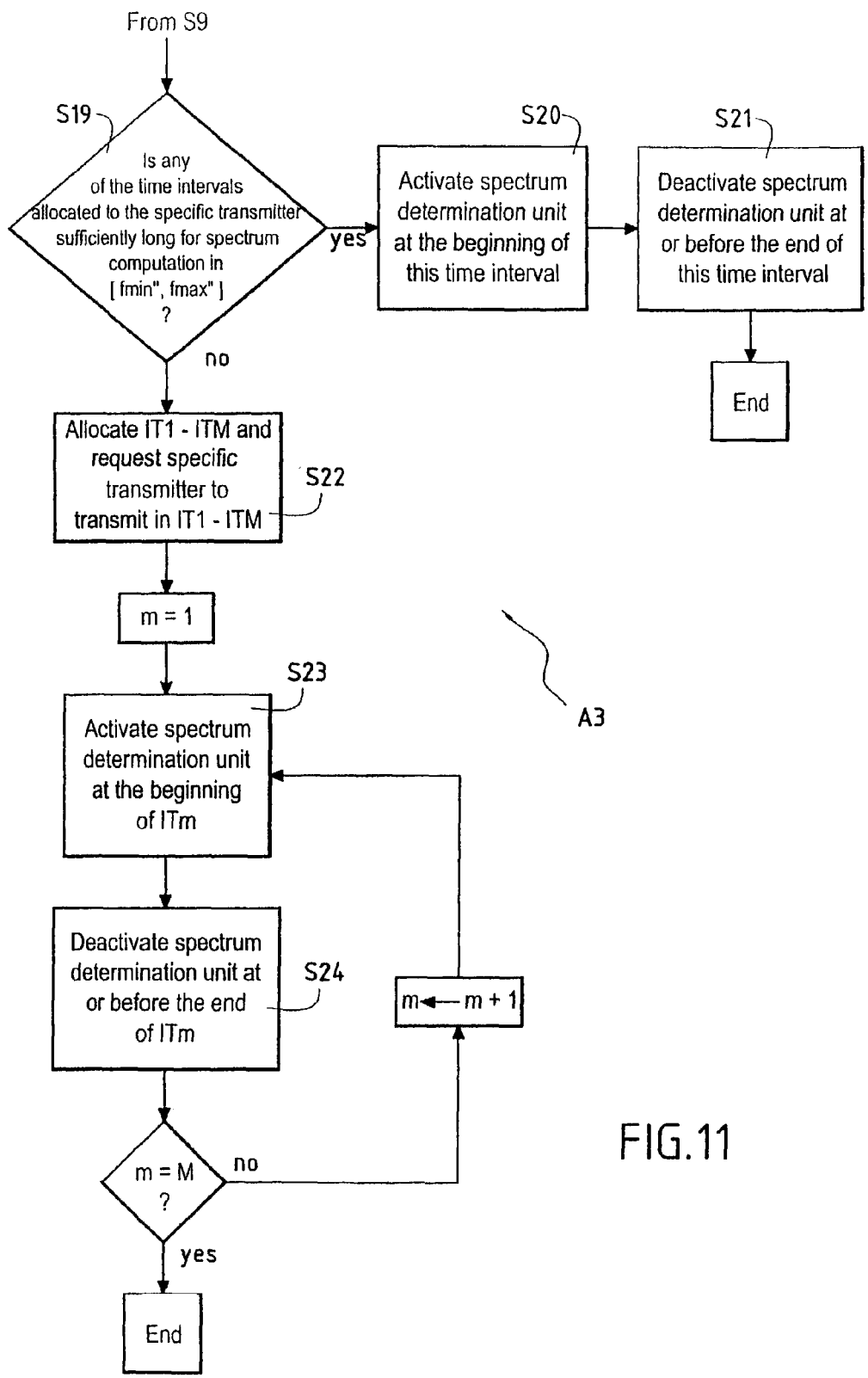
FIG. 11 shows a third sub-algorithm of the algorithm of FIG. 5.

The sub-algorithm A3 is illustrated in FIG. 11. In a step S19, the control unit 15 determines whether time intervals have already been allocated to the specific transmitter 2' selected by the operator for future traffic data transmissions from this specific transmitter and, if the check result is positive, whether any of these allocated time intervals has a length not less than the time required to compute the spectrum of the frequency band [fmin", fmax"] of the incoming signal. If such an allocated time interval exists, steps S20 and S21 are executed, in which the control unit 15 controls the spectrum determination unit 17 so that the spectrum of the frequency band [fmin", fmax"] of the incoming signal be computed during this allocated time interval. The steps S20 and S21 are performed in a manner comparable to previously described steps S14 and S15.

If, on the hand, step S19 determines that no time interval has been allocated for future traffic data transmission from the specific transmitter 2' (i.e. no request has recently been made in this respect by this transmitter) or that time intervals have been allocated but none of them has a length sufficient for computation of the spectrum of the incoming signal in the frequency band [fmin", fmax"], a step S22 is executed, in which one or several time intervals IT1 to ITM are reserved for this computation. The reserved time intervals IT1 to ITM are outside the time intervals allocated to the specific transmitter 2' for traffic data transmission to the TDMA receiver 10. The number, rate and length of these reserved time intervals are chosen according to the same criteria as exposed above for step S10.

After the time intervals IT1 to ITM have been reserved, the control unit 15 allocates each of them to the specific transmitter 2', and requests this transmitter 2' to send a message of a predetermined length during each of the allocated, reserved time intervals. Next, in step S23 and S24, the control unit 15 controls the spectrum determination unit 17 so that the spectrum of the frequency band [fmin", fmax"] be computed during the allocated, reserved time intervals IT1 to ITM. Steps S23 and S24 are performed in a manner similar to previously described steps S11 and S12.

In the sub-algorithm A3, as the spectrum values (fi, Pi) are computed only during time intervals in which the specific transmitter 2' selected by the operator effectively transmits data (these data may be either traffic data, in the case of steps S20 and S21, or predetermined messages, in the case of steps S22 to S24), these spectrum values are representative of the spectrum of the signal transmitted by this specific transmitter.

In the above-described algorithm ALG, the spectrum computation of the incoming signal in the frequency band [fmin', fmax'] (steps S3, S4), NOP (steps S7, S8) or [fmin", fmax"] (sub-algorithms A1, A2, A3) is carried out by scanning the frequency band only once, i.e. each couple (fi, Pi) is calculated only once. This is indeed sufficient due to the synchronization process according to the invention, in which the spectrum computation is carried out only during precise time intervals chosen as a function of the spectral characteristic SC to be determined and the time intervals allocated to the transmitters for data transmission. However, it can be envisaged to scan the frequency band several times, i.e. to compute the spectrum during time intervals which are sufficiently long for the spectrum determination unit 17 to be able to sequentially calculate several sets of couples (fi, Pi). This can be made in the case when a post-processing, such as an averaging or a maximum holding, of the spectrum values obtained is desired.

Figure 12:
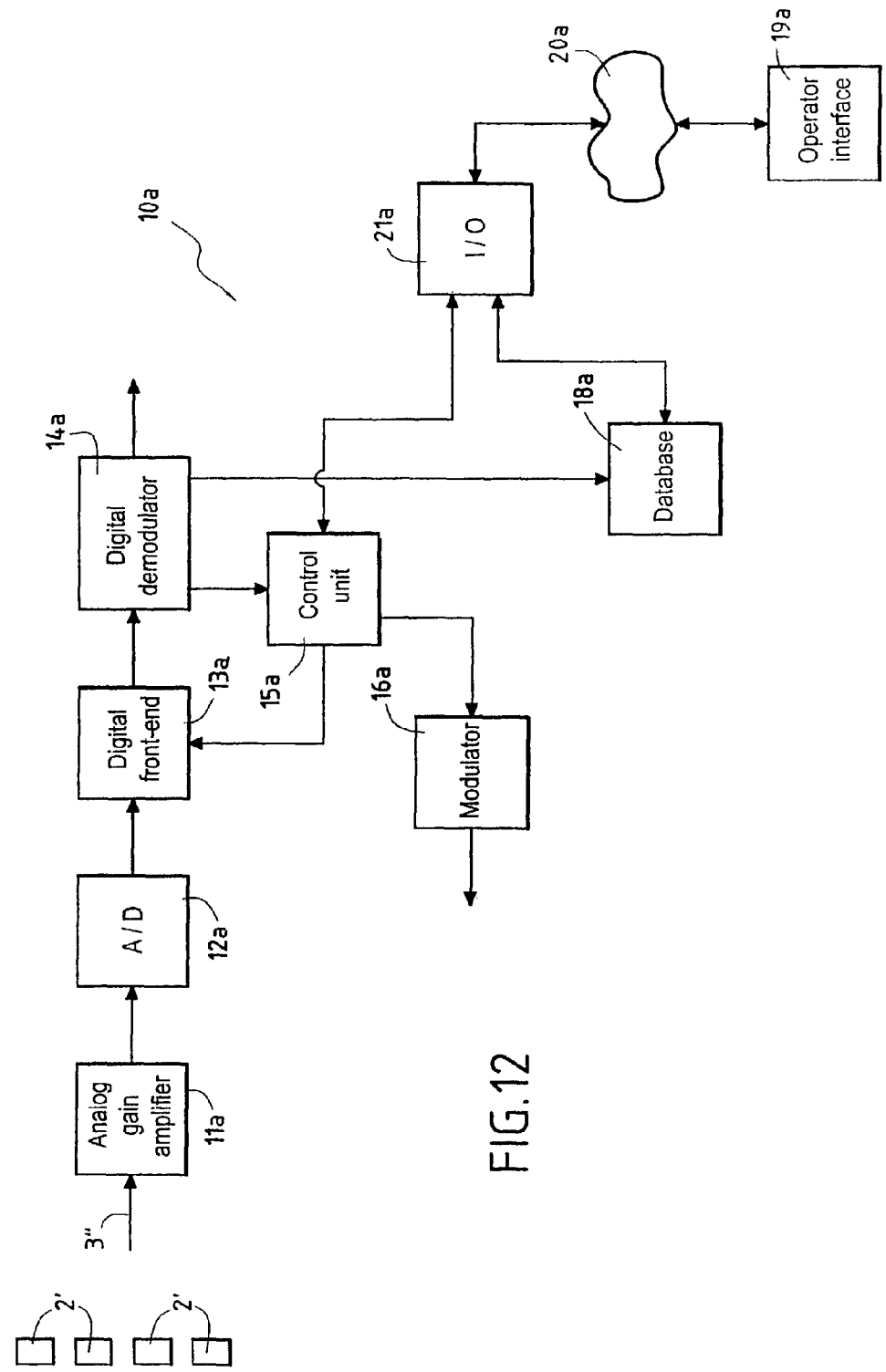
FIG. 12 is a block-diagram showing a TDMA receiver according to a second embodiment of the invention.

FIG. 12 shows a TDMA receiver, 10*a*, according to a second embodiment of the invention.

The TDMA receiver 10*a* differs from the TDMA receiver 10 according to the first embodiment in that it does not have a separate spectrum determination unit. The spectrum determination function in the second embodiment is fulfilled by the digital front-end 13*a* and part of the digital demodulator 14*a*.

Figure 13:
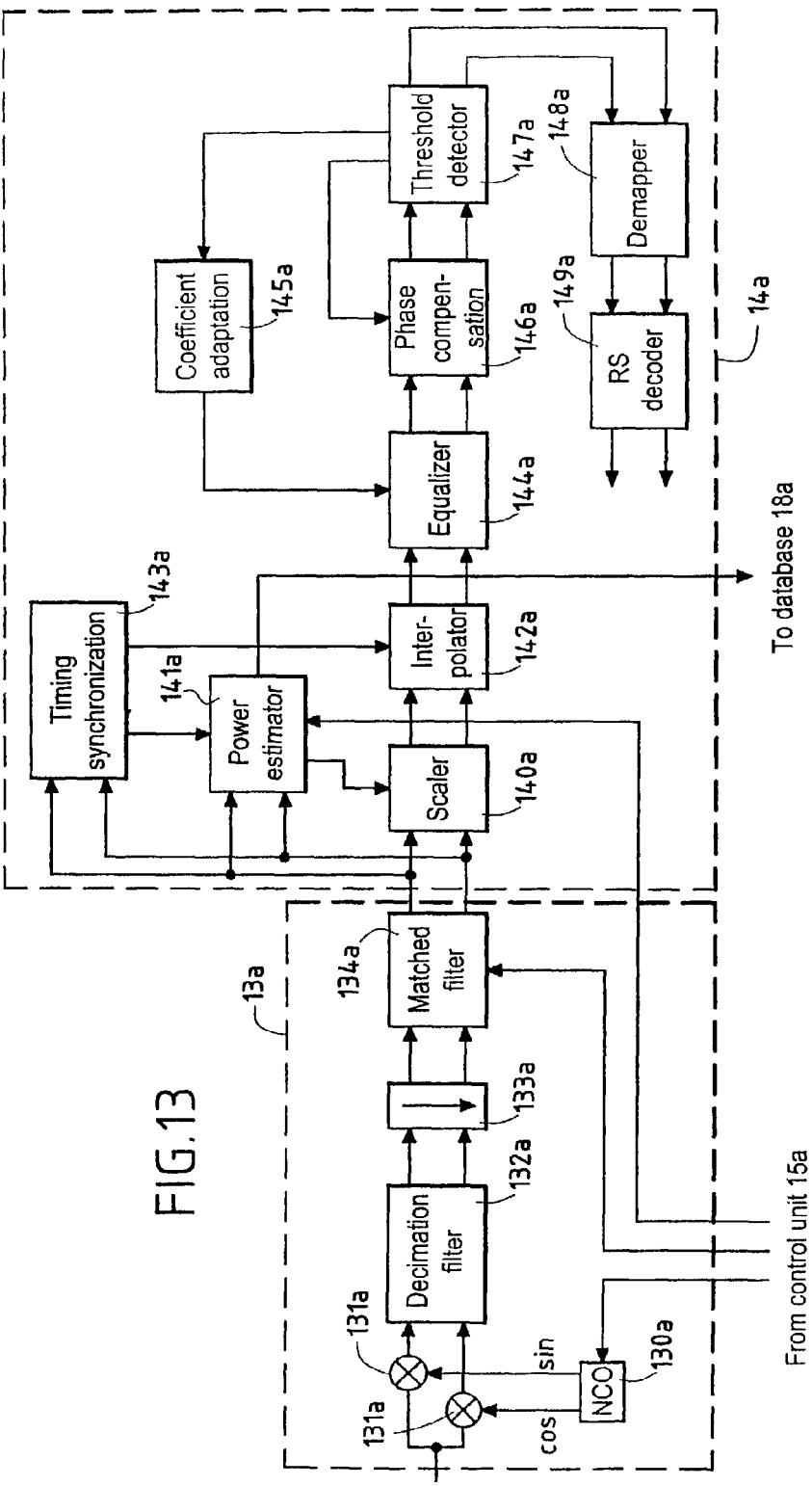
FIG. 13 is a block-diagram showing a digital front-end and a digital demodulator used in the TDMA receiver according to the second embodiment.

FIG. 13 shows the structure of the digital front-end 13*a* and the digital demodulator 14*a*. This structure is basically the same as that of the digital front-end 13 and the digital demodulator 14 of the first embodiment. However, unlike the first embodiment in which the configuration of the digital front-end and the digital demodulator is constant, the digital front-end 13a and the digital demodulator 14a of the second embodiment may have two different configurations, which are selectable by the control unit 15a, namely:

a first configuration for performing baseband conversion and filtering operations on the digitized signal output by the analog-to-digital converter 12a so as to extract the TDM signal from the incoming signal and for demodulating the TDM signal, as in the first embodiment; and a second configuration in which the numerically controlled oscillator 130a, the decimation filter 132a, the decimator 133a, the matched filter 134a and the power estimator 141a serve to compute the spectrum of the digitized incoming signal in a frequency band [fmin, fmax] selected by the operator via the operator interface 19a.

As explained above for the first embodiment, the decimation filter, the decimator and the matched filter of the digital front-end form together a low-pass filter. In the second embodiment, this low-pass filter is programmable so that the bandwidth of its filtering response may be changed. Thus, in the first configuration, the bandwidth of the filtering response is equal to the bandwidth of the channel in which the transmitters 2' transmit the data, whereas in the second configuration, it is equal to the spectrum computation resolution W.

One possible manner to render the low-pass filter 132a, 133a, 134a programmable is to use a programmable cascaded integrator comb (CIC) filter as the decimation filter 132a or a programmable finite impulse response (FIR) filter as the matched filter 134a. In the case, for example, of a programmable FIR matched filter 134a, two sets of coefficients are stored in the filter 134a and the control unit 15a selects either one of these two sets as a function of the configuration desired.

According to this second embodiment, so long as no request for spectrum computation has been received from the operator interface 19a, the digital front-end 13a and the digital demodulator 14a are in the conventional, first configuration. After a request for spectrum computation has been received from the operator interface 19a, the control unit 15a synchronizes the operation of the digital front-end 13a and the digital demodulator 14a as a function of the time intervals allocated to the transmitters 2'.

Figure 14:
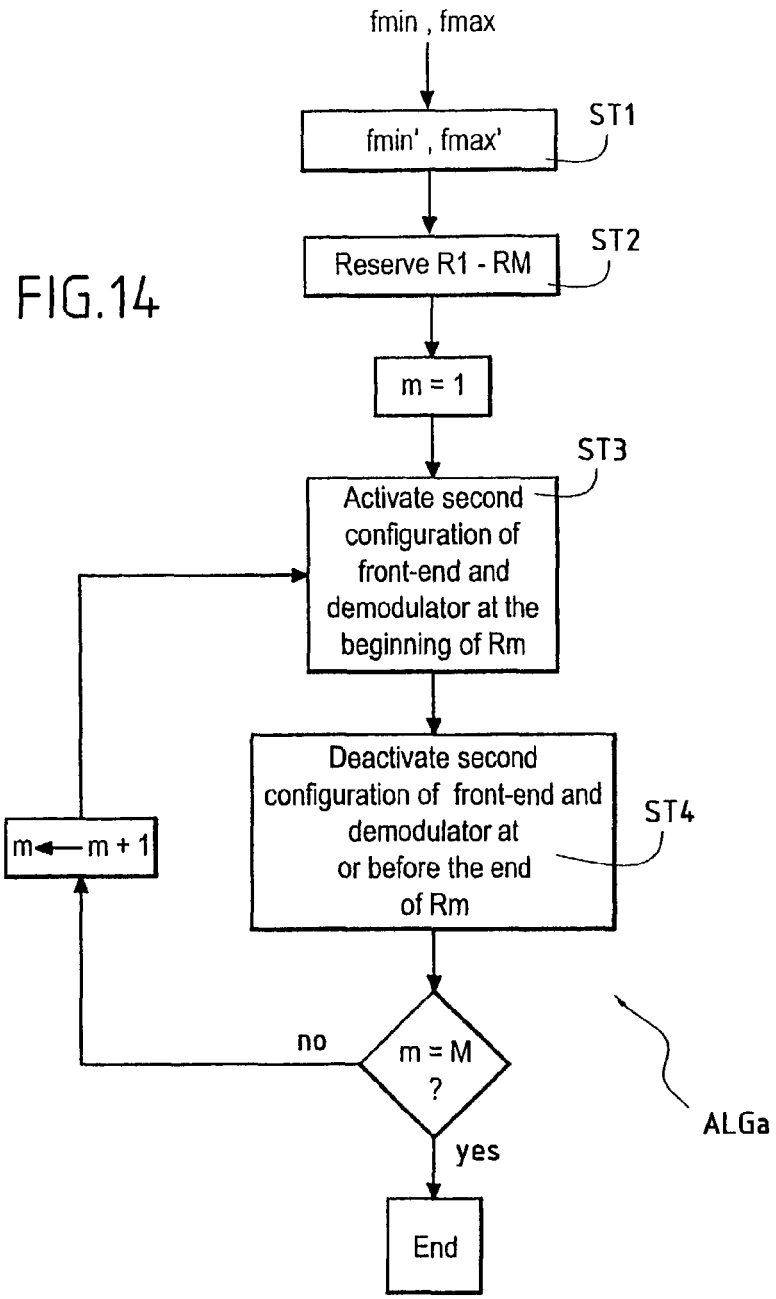
FIG. 14 shows an algorithm performed in the TDMA receiver according to the second embodiment.

The algorithm, ALGa, executed by the control unit 15a for controlling the spectrum determination function is illustrated in FIG. 14.

In a first step ST1, the control unit 15a receives a minimum value, fmin, and a maximum value, fmax, of a frequency band in which the spectrum of the TDM signal is to be determined, and converts this frequency band into a frequency band [fmin', fmax'] whose width is a multiple of the spectrum computation resolution W, as in the first embodiment.

In a step ST2, the control unit 15a reserves one or several time intervals for the spectrum computation. During these reserved time intervals, which are inserted between time intervals allocated to the transmitters 2' for traffic data transmission, the transmitters 2' are not allowed to transmit. The number, rate and length of the reserved time intervals are chosen according to the same criteria as for the sub-algorithm A1 in the first embodiment.

In a step ST3, the control unit 15a activates the second configuration (i.e. deactivates the first configuration) of the digital front-end 13a and the digital demodulator 14a at or just after the beginning of the first reserved time interval by changing the bandwidth of the response of the low-pass filter 132a, 133a, 134a to the value W, and then sequentially provides sub-band center frequencies f1, f2, etc. to the numerically controlled oscillator 130a and informs the power estimator 141a that the couples (fi, Pi) which will be obtained in the reserved time intervals will have to be stored in the database 18a. Once the desired number of couple(s) (fi, Pi) corresponding to the first reserved time interval has (have) been obtained, i.e. at or before the end of the first reserved time interval, the control unit 15a deactivates the second configuration (i.e. reactivates the first configuration) in a step ST4. Steps ST3 and ST4 are repeated until all couples (fi, Pi) corresponding to the frequency band [fmin', fmax'] have been obtained.

Figure 15:
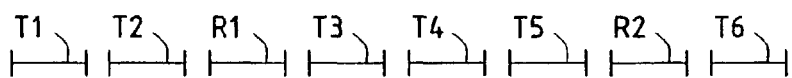
FIG. 15 illustrates reserved time intervals inserted between allocated time intervals in the algorithm of FIG. 14.

FIG. 15 shows, by way of illustration, a plurality of time intervals T1-T6 allocated to transmitters 2' and two time intervals R1 and R2 reserved for the spectrum computation. The reserved time interval R1 is inserted between the allocated time intervals T2 and T3. The reserved time interval R2 is inserted between the allocated time intervals T5 and T6. During the allocated time intervals T1-T6, the front-end 13a and the demodulator 14a are in the first configuration, and thus baseband convert, filter and demodulate the incoming signal. During the reserved time intervals R1 and R2, in which no transmitter is allowed to transmit, the front-end 13a and the demodulator 14a are in the second configuration, and thus compute the spectrum in the frequency band specified by the operator.

When the frequency band [fmin, fmax] selected by the operator has a portion in common with the useful signal frequency band of the incoming signal, the spectrum values (fi, Pi) corresponding to this portion are representative of the noise and interferences present in the useful signal frequency band because these values are calculated only during time intervals in which the transmitters 2' are not allowed to transmit. Hence, unlike prior art devices, the TDMA receiver 10a according to the second embodiment can have a precise knowledge of the noise and interferences in the useful signal frequency band. However, the spectrum determination function of the TDMA receiver 10a may also serve to monitor the spectrum of the incoming signal outside the useful signal frequency band. A further advantage of this second embodiment over prior art is that the amount of hardware is reduced due to the fact that the spectrum determination function is performed by the front-end 13a and the demodulator 14a.

Figure 16:
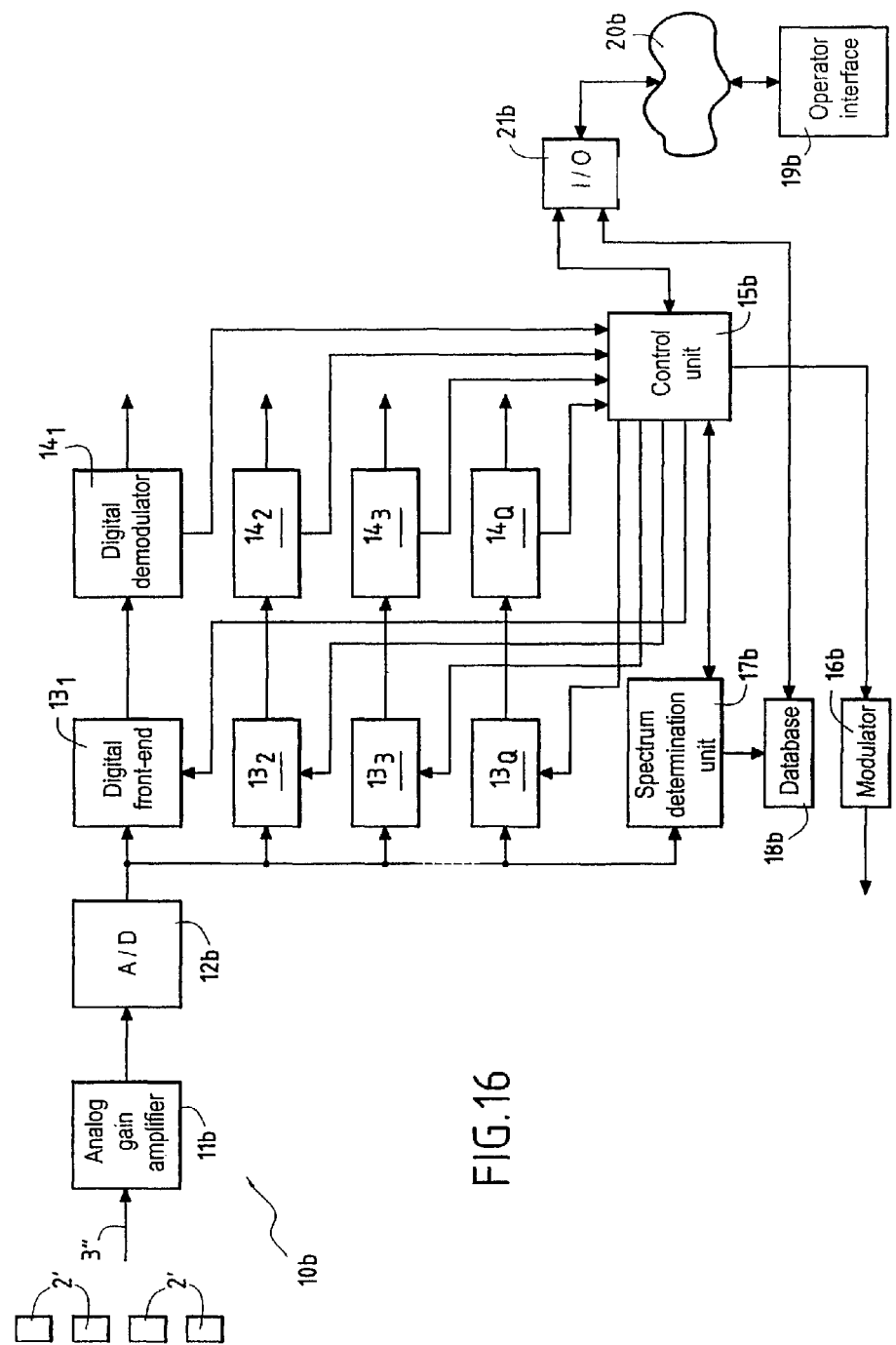
FIG. 16 is a block-diagram of an FDMA/TDMA receiver according to a third embodiment of the invention.

FIG. 16 shows a receiver, 10b, according to a third embodiment of the invention. The receiver 10b is an FDMA (frequency-division multiplex access)/TDMA (time-division multiplex access) receiver and is thus used in an FDMA/TDMA network, such as an HFC network. The receiver 10b is designed to allocate to each of a plurality of transmitters 2' one of a plurality of channels and time intervals in which the transmitter 2' is allowed to transmit signals towards the receiver 10b. Each channel is defined by a predetermined carrier frequency and a predetermined frequency band. The receiver 10b receives from a communication link 3" an incoming signal resulting from the multiplexing of different signals output by the transmitters 2' during the allocated time intervals and in the pre-cited channels. The incoming signal consists, in the frequency bands of these channels, of an FDM (frequency-division multiplex)/TDM (time-division multiplex) signal which is composed of a useful FDM/TDM signal, noise and interferences. In other terms, the incoming signal consists, in the frequency band of each channel, of a TDM signal which is composed of a useful TDM signal, noise and interferences. Each TDM signal corresponds to a group of transmitters 2' that transmit their data in a same channel. Outside the frequency bands of the channels, the incoming signal consists of noise and interferences. As the frequency bands of the allocated channels contain the useful signal, they are also referred to as "useful signal frequency bands".

The FDMA/TDMA receiver $10b$ according to this third embodiment of the invention comprises an analog gain amplifier $11b$ which receives the incoming signal, an analog-to-digital converter $12b$, which digitizes the amplified signal output by the amplifier $11b$, a plurality of digital front-ends $13_1$ to $13_Q$, each of which receives the digitized signal output by the converter $12b$, and a plurality of digital demodulators $14_1$ to $14_Q$ following, respectively, the digital front-ends $13_1$ to $13_Q$. The digital front-ends $13_1$ to $13_Q$ each have the same structure as the front-end $13$ illustrated in FIG. 3. The digital demodulators $14_1$ to $14_Q$ each have the same structure as the digital demodulator $14$ illustrated in FIG. 3. However, each front-end $13_q$ (where q=1 to Q) is configured to select and extract a respective channel from the above-mentioned channels so as to recover the corresponding TDM signal, for subsequent processing of the TDM signal by the digital demodulator $14_q$ and the other processing circuits (not shown) of the receiver $10b$. Thus, the numerically controlled oscillator of each front-end $13_q$ is controlled to oscillate at the carrier frequency of the respective channel and the bandwidth of the low-pass filter of each front-end $13_q$ is set at the width of the frequency band of the respective channel.

The receiver $10b$ further comprises a control unit $15b$ for controlling the operation of the receiver $10b$ and managing the frequency-division and time-division access of the transmitters $2'$, a modulator $16b$, a spectrum determination unit $17b$ and a database memory $18b$. The spectrum determination unit $17b$ is designed to compute the spectrum of the incoming signal in a frequency band [fmin, fmax] specified by an operator through an operator interface $19b$ connected to the receiver $10b$ via a network $20b$ and an input/output interface $21b$. The spectrum determination unit $17b$ may be a circuit in which is implemented an FFT. However, typically, the spectrum determination unit $17b$ has the structure illustrated in FIG. 4C and computes the spectrum in the manner illustrated in FIGS. 4A and 4B.

In this third embodiment of the invention, the spectrum determination unit $17b$ is controlled by the control unit $15b$ and its operation may be synchronized as a function of the allocated time intervals corresponding to a given channel among the above-mentioned channels for the determination of the spectrum in at least a portion of the frequency band of the given channel. Preferably, the said "at least a portion of the frequency band of the given channel" consists of the whole frequency band of the given channel. Thus, in practice, the synchronization is activated when the frequency band selected by the operator is within, or coincides with, the frequency band of the given channel, or more generally when this selected frequency band has a portion in common with the frequency band of the given channel. In the latter case, the synchronization with respect to the allocated time intervals corresponding to the given channel is performed only for the portion in common. For the portions of the selected frequency band which are outside the frequency band of the given channel, such a synchronization is not needed.

Specifically, if the operator wishes to have the spectrum of the noise and interferences in the given channel computed, the same kind of algorithm as the sub-algorithm A1 shown in FIG. 8 is executed for this channel. If the operator wishes to have the spectrum of the incoming signal (or FDM/TDM signal) in the given channel when at least one transmitter $2'$ is transmitting in this channel computed, the same kind of algorithm as the sub-algorithm A2 shown in FIG. 10 is executed for this channel. If the operator wishes to have the spectrum of the signal output by a specific transmitter $2'$ in the given channel computed, the same kind of algorithm as the sub-algorithm A3 shown in FIG. 11 is executed for this channel. If, on the other hand, the operator wishes to have the spectrum of the incoming signal in a band outside each channel computed, no synchronization is needed and steps similar to steps S3 and S4 shown in FIG. 5 are executed.

In a general manner, the control unit $15b$ uses the same principles as in the first embodiment to control the spectrum determination unit $17b$. It will however be noted that, in the third embodiment, the frequency band selected by the operator may encompass or overlap the frequency bands of plural channels. For each portion of the selected frequency band which is in common with a channel frequency band, the operation of the spectrum determination unit $17b$ may be synchronized as a function of the allocated time intervals associated with the corresponding channel.

Figure 17:
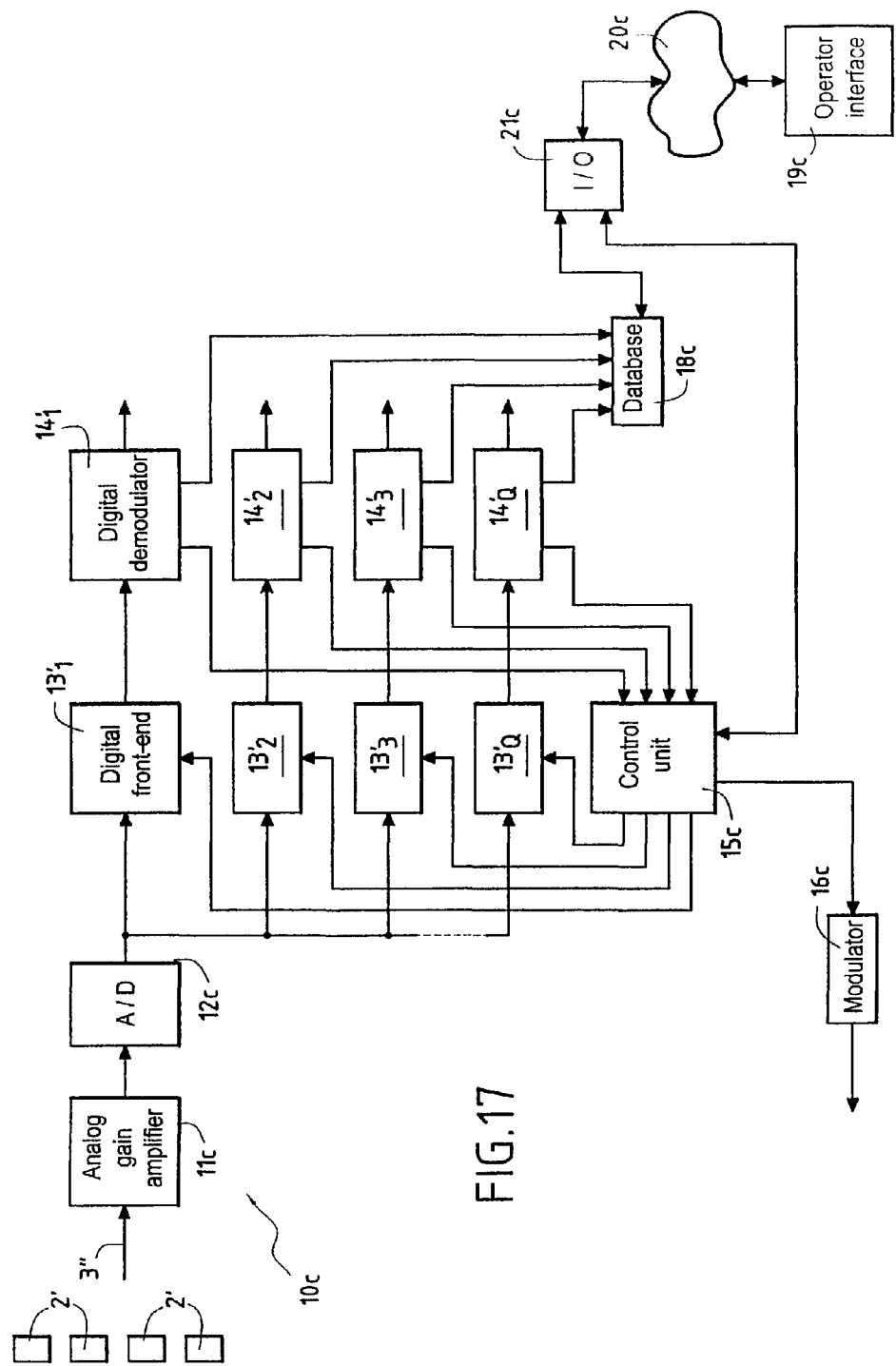
FIG. 17 is a block-diagram of an FDMA/TDMA receiver according to a fourth embodiment of the invention.

FIG. 17 shows an FDMA/TDMA receiver, $10c$, according to a fourth embodiment of the invention. The receiver $10c$ differs from the FDMA/TDMA receiver $10b$ according to the third embodiment in that it does not have a separate spectrum determination unit. The spectrum determination function in the fourth embodiment is fulfilled by the digital front-ends $13_1'$ to $13_Q'$ and part of the digital demodulators $14_1'$ to $14_Q'$.

Thus, in a manner similar to the second embodiment of the invention (FIG. 12), each front-end and demodulation unit $13_q'$-$14_q'$ (q=1 to Q) may take two different configurations, namely:

a first configuration for extracting the respective channel, through baseband conversion and filtering operations, so as to recover the corresponding TDM signal, and for demodulating the TDM signal, as in the third embodiment; and a second configuration in which the numerically controlled oscillator, the decimation filter, the decimator and the matched filter of the front-end $13_q'$ and the power estimator of the demodulator $14_q'$ serve to compute the spectrum of the digitized incoming signal in all or part of a frequency band [fmin, fmax] selected by the operator via the operator interface $19c$.

Like the receiver $10a$ according to the second embodiment, the receiver $10c$ according to the fourth embodiment may compute the spectrum of noise and interferences in the signal received from the communication link $3''$. For this purpose, when the selected frequency band [fmin, fmax] has a portion in common with the frequency band of a given channel, the control unit $15c$ reserves time intervals during which the transmitters $2'$ are not allowed to transmit in the given channel and the digital front-end and the power estimator of the digital demodulator corresponding to the given channel are placed in the second configuration and made to compute the spectrum of the incoming signal in the selected frequency band during these reserved time intervals. During these reserved time intervals, the digital front-end and the power estimator corresponding to the given channel may compute the spectrum in both the pre-cited portion in common and any portion of the selected frequency band which is outside each channel frequency band.

Figure 18:
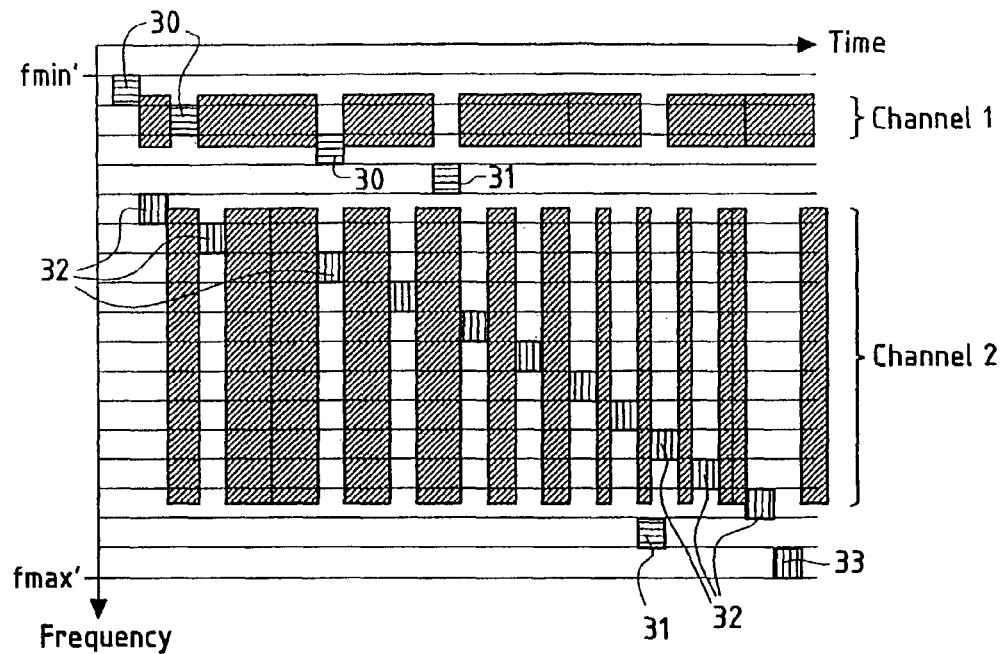
FIG. 18 illustrates allocated and reserved time intervals in two given channels according to an asynchronous mode of the FDMA/TDMA receiver according to the fourth embodiment.

By way of illustration, FIG. 18 shows how the spectrum of the incoming signal in a selected frequency band [fmin, fmax] which encompasses the frequency bands of two adjacent channels, denoted channel $1$ and channel $2$, may be computed. This spectrum computation is carried out by first and second front-end and demodulation units among the front-end and demodulation units $13_q'$-$14_q'$. The first front-end and demodulation unit is the one that corresponds to channel $1$. The second front-end and demodulation unit is the one that corresponds to channel 2. As shown in FIG. 18, the first front-end and demodulation unit computes the noise spectrum in channel 1 during reserved time intervals in which no transmitter 2' is allowed to transmit in channel 1 (see reference numeral 30) and the noise spectrum in portions of the selected frequency band [fmin, fmax] which are outside channels 1 and 2 (see reference numeral 31). The second front-end and demodulation unit computes the noise spectrum in channel 2 during reserved time intervals in which no transmitter 2' is allowed to transmit in channel 2 (see reference numeral 32) and the noise spectrum in a portion of the selected frequency band [fmin, fmax] which is outside channels 1 and 2 (see reference numeral 33).

Figure 19:
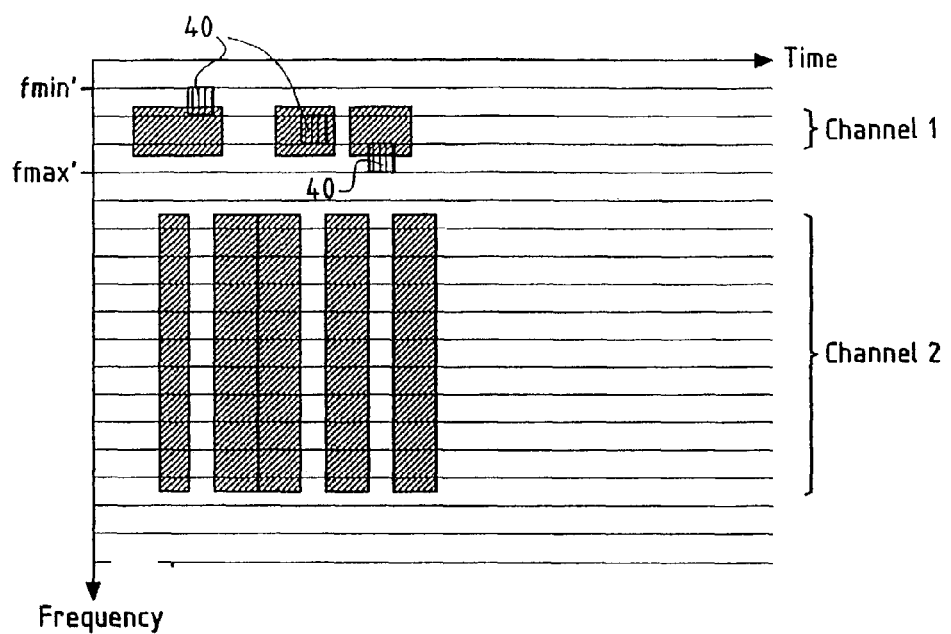
FIG. 19 illustrates how a front-end and demodulation unit associated with a channel may be used to compute the spectrum of the signal transmitted in another channel.

The receiver 10c according to the fourth embodiment of the invention may also compute the spectrum of the incoming signal in the frequency band of a given channel when at least one transmitter 2' is transmitting in this channel, regardless of which transmitter(s) 2' is (are) transmitting (this corresponds to a spectral characteristic which is similar to the spectral characteristic SC2 exposed above for the first embodiment), or the spectrum of the incoming signal in the frequency band of a given channel when a specific transmitter 2' is transmitting in this channel (this corresponds to a spectral characteristic which is similar to the spectral characteristic SC3 exposed above for the first embodiment). This can be done by reserving time intervals in a channel other than the given channel for the spectrum computation, the reserved time intervals being chosen so that they are each included in a time interval allocated in the given channel to a transmitter 2' (first spectral characteristic) or so that they are each included in a time interval allocated in the given channel to a same specific transmitter 2' (second spectral characteristic). By way of example, FIG. 19 illustrates a configuration in which the spectrum of the signal transmitted from a transmitter in a first channel, "channel 1", is computed by the front-end and demodulation unit associated with a second channel, "channel 2". Time intervals are reserved in which no transmission from the transmitters 2' is allowed in channel 2. The reserved time intervals are selected so as to be each included in a time interval allocated to a transmitter 2' for transmission from this transmitter in channel 1. During these reserved time intervals, the front-end and demodulation unit associated with channel 2 computes the spectrum of the signal received by the receiver 10c in channel 1, as shown at reference numeral 40.

Figure 20:
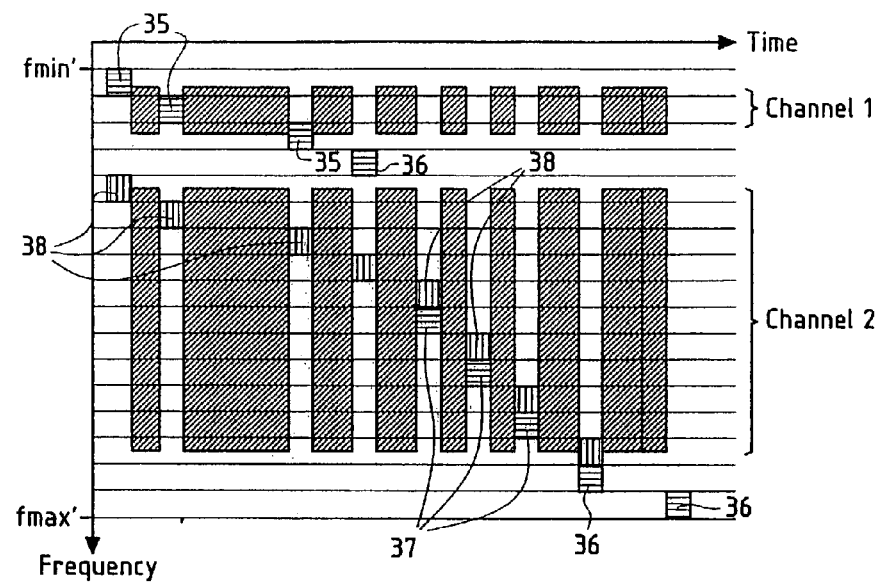
FIG. 20 illustrates allocated and reserved time intervals in two given channels according to a synchronous mode of the FDMA/TDMA receiver according to the fourth embodiment.

The examples of FIGS. 18 and 19 correspond to cases where the front-end and demodulation units $13_q'$-$14_q'$ operate according to an asynchronous mode. FIG. 20 shows another case, in which the front-end and demodulation units $13_q'$-$14_q'$ operate according to a synchronous mode. In the case of FIG. 20, the control unit 15c manages the frequency-division/time-division access so that the reserved time intervals for computing the noise spectrum are the same in channel 1 and channel 2. Thus, each of the first and second front-end and demodulation units may compute the noise spectrum in its channel, as in FIG. 18, but also the noise spectrum in all or part of the frequency band of the other channel. In the example of FIG. 20, the first front-end and demodulation unit computes, during the reserved time intervals, the noise spectrum in channel 1 (see reference numeral 35), the noise spectrum in portions of the selected frequency band [fmin, fmax] which are outside channels 1 and 2 (see reference numeral 36) and the noise spectrum in portions of the frequency band of channel 2 (see reference numeral 37). The second front-end and demodulation unit computes, during the same reserved time intervals, the noise spectrum in channel 2 (see reference numeral 38).

The invention claimed is:

1. A system comprising: a network device, including a memory, the network device to:
   allocate, to each of a plurality of transmitters, time intervals during which the transmitter is allowed to transmit signals,
   receive an incoming signal, in a predetermined frequency band, resulting from multiplexing of signals from said plurality of transmitters during said time intervals, the incoming signal being a TDM (time division multiplexed) signal in the predetermined frequency band,
   extract and process said TDM signal,
   determine a spectrum of the incoming signal during one or more time intervals not allocated to any of the plurality of transmitters, and
   store information regarding the determined spectrum in the memory.

2. The system according to claim 1, where the network device is further to determine the spectrum of the incoming signal during time intervals allocated to the plurality of transmitters.

3. The system according to claim 2, where the network device is to request said transmitters to transmit predetermined signals towards the network device during the time intervals allocated to the plurality of transmitters.

4. The system according to claim 1, where the network device is further to determine of the spectrum of the incoming signal during time intervals allocated to the plurality of transmitters, and determine the spectrum only during at least one time interval allocated to a specific transmitter among said plurality of transmitters.

5. The system according to claim 4, where, when determining the spectrum only during the at least one time interval allocated to the specific transmitter, the network device is further to allocate reserved time intervals to the specific transmitter and request the specific transmitter to transmit predetermined signals towards said network device during said reserved time intervals.

6. The system according to claim 1, where the network device comprises:
   an analog-to-digital converter to digitize the incoming signal, and
   a digital front-end to extract the TDM signal by performing baseband conversion and filtering operations on the digitized incoming signal for subsequent demodulation of the TDM signal.

7. The system according to claim 6, where the network device further comprises a digital computation unit, distinct from the digital front-end, to receive the digitized incoming signal.

8. The system according to claim 6, where the network device further comprises a power estimator to estimate a power of the TDM signal for subsequent scaling.

9. The system according to claim 1, where the network device further comprises an operator interface for selecting a frequency band in which the spectrum is to be determined.

10. A system comprising:
    a receiver, including a memory, the receiver to:
    allocate, to each of a plurality of transmitters, one of a plurality of channels and time intervals in which the transmitter is allowed to transmit signals to the receiver, each of said channels having a predetermined frequency band,
    receive an incoming signal resulting from multiplexing of signals output from said transmitters during said time intervals and transmitted in said channels, the incoming signal comprising, in each of the channels, a TDM (time division multiplexed) signal, extract, from the incoming signal and for a respective channel, the TDM signal corresponding to the respective channel, determine a spectrum of the incoming signal during one or more time intervals not allocated to any of the plurality of transmitters, and store information regarding the determined spectrum in the memory.

11. The system according to claim 10, where the receiver is further to determine the spectrum of the incoming signal during time intervals allocated to the plurality of transmitters.

12. The system according to claim 11, where the receiver is further to request said transmitters to transmit predetermined signals towards said receiver during the time intervals allocated to the transmitters.

13. The system according to claim 10, where the receiver is further to: determine the spectrum of the incoming signal during time intervals allocated to the plurality of transmitters, and determine the spectrum of the respective channel only during at least one time interval allocated to a specific transmitter among said plurality of transmitters.

14. The system according to claim 13, where, when determining the spectrum of the respective channel only during the at least one time interval, the receiver is further to:

reserve the at least one time interval, allocate said reserved at least one time interval to the specific transmitter, and request said specific transmitter to transmit predetermined signals towards said receiver during said reserved at least one time interval.

15. The system according to claim 10, where, the receiver is further to digitize the incoming signal, and perform baseband conversion and filtering operations on the digitized incoming signal so as to obtain the TDM signal corresponding to the respective channel for subsequent demodulation of said TDM signal.

16. The system according to claim 15, where the receiver is further to:

extract the TDM signal by performing baseband conversion and filtering operations on the digitized incoming signal during the corresponding allocated time intervals for subsequent demodulation of the TDM signal, and compute the spectrum of the digitized incoming signal.

17. The system according to claim 15, where the receiver is further to:

reserve, for each of said plurality of channels, time intervals which are outside each of the allocated time intervals corresponding to the channel, the reserved time intervals of each of said plurality of channels coinciding with the reserved time intervals of another one of said plurality of channels, extract the TDM signal corresponding to the respective channel by performing baseband conversion and filtering operations on the digitized incoming signal during the corresponding allocated time intervals for subsequent demodulation of the TDM signal, and compute, during the reserved time intervals, the spectrum of the digitized incoming signal in at least a portion of the predetermined frequency band of one of said plurality of channels.

18. A method comprising:

receiving, at a device, a time division multiplexed (TDM) signal that includes a plurality of time intervals from a plurality of transmitters, the TDM signal being within a frequency band;

extracting, by the device, the TDM signal;

processing, by the device, the extracted TDM signal;

determining, by the device the spectrum of the received signal during time intervals not allocated to any of the plurality of transmitters; and storing, in a memory associated with the device, information regarding the determined spectrum.

19. The method of claim 18, where wherein the transmitters include cable modems.

* * * * *

UNITED STATES PATENT AND TRADEMARK OFFICE
CERTIFICATE OF CORRECTION

| | | |
|---|---|---|
| PATENT NO. | : 8,300,656 B2 | Page 1 of 1 |
| APPLICATION NO. | : 10/359218 | |
| DATED | : October 30, 2012 | |
| INVENTOR(S) | : Fabien Buda et al. | |

It is certified that error appears in the above-identified patent and that said Letters Patent is hereby corrected as shown below:

Column 21, line 34, claim 15 should read: "where the receiver is further to digitize the incoming sig-"
Column 22, line 32, claim 18 should read: "determining, by the device, the spectrum of the received"

Signed and Sealed this
Fifth Day of February, 2013

Teresa Stanek Rea
*Acting Director of the United States Patent and Trademark Office*